(12) United States Patent
Nozaki et al.

(10) Patent No.: US 7,146,270 B2
(45) Date of Patent: Dec. 5, 2006

(54) VEHICLE ALLOCATION PROCESSING APPARATUS, SYSTEM, METHOD, AND PROGRAM, AND RECORDING MEDIUM RECORDING THE PROGRAM

(75) Inventors: Takashi Nozaki, Tokyo (JP); Kouji Amano, Tokyo (JP)

(73) Assignee: Increment P Corporation, Tokyo (JP)

( * ) Notice: Subject to any disclaimer, the term of this patent is extended or adjusted under 35 U.S.C. 154(b) by 348 days.

(21) Appl. No.: 10/815,971

(22) Filed: Apr. 2, 2004

(65) Prior Publication Data

US 2004/0236502 A1 Nov. 25, 2004

(30) Foreign Application Priority Data

Apr. 4, 2003 (JP) ............................. 2003-101109

(51) Int. Cl.
*G01C 21/26* (2006.01)
*G07B 15/02* (2006.01)
(52) U.S. Cl. ...................... 701/200; 701/201; 701/209; 705/5; 705/13
(58) Field of Classification Search ........ 701/200–201, 701/209; 705/5, 13; 340/992, 993, 988; 235/375, 382.5, 384
See application file for complete search history.

(56) References Cited

U.S. PATENT DOCUMENTS 5,289,369 A * 2/1994 Hirshberg ................... 705/13
5,973,619 A 10/1999 Paredes ...................... 340/994

FOREIGN PATENT DOCUMENTS

JP 2002-190038 7/2002
JP 2002-342424 11/2002

OTHER PUBLICATIONS

Patent Abstracts of Japan vol. 2002, No. 09, Sep. 4, 2002 & JP 2002 133588 A (Mitsubishi Heavy Ind Ltd), May 10, 2002 *abstract*.
Patent Abstracts of Japan vol. 2003, No. 05, May 12, 2003 & JP 2003 022496 A (Fujitsu Ltd), Jan. 24, 2003 *abstract*.
European Search Report of Aug. 11, 2005.

* cited by examiner

*Primary Examiner*—Y. Beaulieu
(74) *Attorney, Agent, or Firm*—Armstrong, Kratz, Quintos, Hanson & Brooks, LLP

(57) ABSTRACT

A vehicle allocation processing apparatus with a rationalized vehicle allocation processing is provided. A server communication section (53) acquires driving status information concerning driving states of vehicles from vehicle communication terminals mounted on the vehicles. A vehicle information storage (552) stores the acquired driving status information and vehicle information concerning the vehicles, linked to each other. The server communication section (53) acquires customer delivery position information concerning a delivery position requested by a customer, and vehicle allocation request information concerning a vehicle requested by the customer and including customer destination information concerning a destination of the customer. An allocable vehicle searching section (543) searches for allocable vehicles, based on the acquired vehicle allocation request information and the stored vehicle information and driving status information. A vehicle allocation processor (545) transmits the acquired vehicle allocation request information to vehicle communication terminals (4) of the allocable vehicles, to suggest allocation to the allocable vehicles.

28 Claims, 7 Drawing Sheets

FIG. 3A

CUSTOMER DATA TABLE

| USER NAME | MEMBER ID | PASSWORD | SERIAL NO. | E-MAIL ADDRESS | RESIDENTIAL ADDRESS | TELEPHONE NUMBER | CASH CARD NO. | CASH CARD EXPIRATION DATE | POINT TOTAL |
|---|---|---|---|---|---|---|---|---|---|
| TARO TANAKA | 00001 | tanaka | OO△△△☐ | △△@××co.jp | SHIMOMEGURO, MEGURO-KU, TOKYO | 03-1234-5678 | 11111-22222222 | 03-08 | 50 |
| TARO YAMADA | 00002 | yamada | OO×××△△ | ☐☐@OOco.jp | KAMIMEGURO, MEGURO-KU, TOKYO | 03-1234-6789 | 11111-33333333 | 04-02 | 80 |

FIG. 3B

TAXI MANAGEMENT TABLE

| TAXI NO. | E-MAIL ADDRESS | STATUS | CURRENT POSITION | START POSITION | DESTINATION |
|---|---|---|---|---|---|
| a001 | OO@☐☐co.jp | VACANT | MEGURO STATION | TOKYO STATION | NAKANO |
| a002 | △△@××co.jp | CHARGED DRIVING | KOENJI | NAKANO | ASAGAYA |

FIG. 7

SEARCH RESULT:
THREE TAXIES BELOW
PLEASE SELECT A DESIRABLE TAXI.

CS — | 1    15 MINUTES   10% DISCOUNT |

1    10 MINUTES   5% DISCOUNT 1    3 MINUTES    0% DISCOUNT

| NO TAXI DESIRABLE |

VEHICLE ALLOCATION PROCESSING APPARATUS, SYSTEM, METHOD, AND PROGRAM, AND RECORDING MEDIUM RECORDING THE PROGRAM

BACKGROUND OF THE INVENTION

1. Field of the Invention

The present invention relates to a vehicle allocation processing apparatus which performs an allocation processing for allocating vehicles to customers in accordance with requests from the customers, and a system, method, and program thereof, and a recording medium which records the program.

2. Description of Related Art

A known conventional vehicle allocation processing to respond to a request for allocation and delivery of a vehicle such as a taxi or the like is as follows.

For example, a customer requests allocation of a taxi from a taxi company on the phone. An operator in the taxi company who receives the request for taxi allocation sends information given by the customer (about the customer's current position, destination, name, phone number, etc.) by wireless transmission to all taxies owned by the company. The operator then waits for a response from each taxi. If a response is given from any taxi, the operator of the taxi company informs the customer of the vehicle number of the taxi, a waiting period until arrival at the current position, and the like, and then carries out a taxi allocation processing.

In another known taxi allocation system, an allocation processing is carried out via the Internet (for example, Jpn. Pat. Laid-Open Publication No. 2002-342424, FIG. 2). In this taxi allocation system, customers input conditions of desired services (e.g., charges, delivery time, and the like) through their own mobile terminals. Taxi allocation request information including conditions of a service is transmitted to a taxi allocation server via the Internet from the mobile terminal. The taxi allocation server searches for a taxi which satisfies the conditions of the desired service according to the taxi allocation request information received. Then, communication terminals of taxies which are thus sought through the search are informed of the order from the customer via the Internet. The drivers of these taxies send information setting a charge, delivery time, and the like to the taxi allocation server from the communication terminals via the Internet, to accept the order. The taxi allocation server sends listed information including taxi information concerning the taxies which can accept the order and the conditions of services, to the customer's mobile terminal via the Internet. The customer sees the listed information on the mobile terminal, selects a desired taxi depending on the conditions of services (a charge, delivery time, and the like), and sends the selection to the taxi allocation server. Then, the taxi allocation server informs the communication terminal of the selected taxi of a successful acceptance, and a taxi allocation processing is carried out.

However, the allocation processing using the phone and the wireless transmission cannot properly manage allocated taxies, and therefore, cannot respond appropriately to customers' requests. For example, this causes a problem of lowered efficiency in allocating taxis.

Also, in the invention described in the foregoing publication, the server manages information concerning taxies in advance, and searches for taxis as requested from customers, based on the information managed. This prior art may hence be considered to be able to respond appropriately to demands from customers and to increase the efficiency in allocating taxies, compared with the above-described taxi allocation processing using the phone and wireless transmission. However, this server has to wait for responses from taxies in executing the taxi allocation processing. This causes problems, for example, in that rapid responses are impossible and the taxi allocation efficiency cannot be increased sufficiently.

SUMMARY OF THE INVENTION

In view of the problems described above, the present invention has its major object to provide a vehicle allocation processing apparatus, a vehicle allocation processing system, a vehicle allocation processing method, and a vehicle allocation processing program, which rationalize the processing of allocating vehicles, and a recording medium which records the program.

According to an aspect of the present invention, a vehicle allocation processing apparatus executes a vehicle allocation processing of allocating vehicles to customers in accordance with requests from the customers, and includes: a driving status information acquiring section which acquires driving status information concerning driving states of the vehicles, from vehicle communication terminals mounted on the vehicles and capable of transmitting/receiving information; a vehicle information storage which stores the driving status information acquired by the driving status information acquiring section, with the driving status information linked to vehicle information concerning the vehicles; a vehicle allocation request information acquiring section which acquires vehicle allocation request information concerning a vehicle requested by a customer and including customer delivery position information concerning a delivery position to which the customer requests delivery, and customer destination position information concerning a destination at which the customer aims; an allocable vehicle searching section which searches for allocable vehicles, based on the vehicle allocation request information acquired by the vehicle allocation request information acquiring section, and the vehicle information and driving status information stored in the vehicle information storage; and a vehicle allocation processor which transmits, as information suggesting allocation, the vehicle allocation request information acquired by the vehicle allocation request information acquiring section to the vehicle communication terminals mounted on the allocable vehicles, based on the vehicle information stored in the vehicle information storage and corresponding to the allocable vehicles.

According to another aspect of the present invention, a vehicle allocation processing apparatus executes a vehicle allocation processing of allocating vehicles to customers in accordance with requests from the customers, and includes: a driving status information acquiring section which acquires driving status information concerning driving states of the vehicles, from vehicle communication terminals mounted on the vehicles and capable of transmitting/receiving information; a vehicle information storage which stores the driving status information acquired by the driving status information acquiring section, with the driving status information linked to vehicle information concerning the vehicles; a setting input recognizer which recognizes input manipulations made by the customers; a vehicle allocation request information acquiring section which acquires vehicle allocation request information concerning a vehicle requested by a customer and including customer delivery position information concerning a delivery position to which the customer requests delivery, by recognizing an input manipulation made by the customer, via the setting input recognizer; an allocable vehicle searching section which searches for allocable vehicles, based on the vehicle allocation request information acquired by the vehicle allocation request information acquiring section, and the vehicle information and driving status information stored in the vehicle information storage; and a vehicle allocation processor which processes at least one of delivery time information concerning delivery time required for delivering each of the allocable vehicles and calculated on the basis of the driving status information stored in the vehicle information storage and corresponding to the allocable vehicles and the customer delivery position information included in the vehicle allocation request information acquired by the vehicle allocation request information acquiring section, and the vehicle information stored in the vehicle information storage and corresponding to each of the allocable vehicles, to make at least one of the delivery time information and the vehicle information reportable to the customer, to suggest the customer to select a particular vehicle, recognizes the selection of the particular vehicle by recognizing an input manipulation made by the customer, via the setting input recognizer, and transmits, as information suggesting allocation, the vehicle allocation request information acquired by the vehicle allocation request information acquiring section, to the vehicle communication terminal mounted on the particular vehicle, based on the vehicle information corresponding to the particular vehicle.

According to still another aspect of the present invention, a vehicle allocation processing apparatus executes a vehicle allocation processing of allocating vehicles to customers in accordance with requests from the customers, and includes: a driving status information acquiring section which acquires driving status information concerning driving states of the vehicles, from vehicle communication terminals mounted on the vehicles and capable of transmitting/receiving information; a vehicle information storage which stores the driving status information acquired by the driving status information acquiring section, with the driving status information linked to vehicle information concerning the vehicle; a vehicle allocation request information acquiring section which acquires vehicle allocation request information concerning a vehicle requested by a customer and including customer delivery position information concerning a delivery position to which the customer requests delivery; a vehicle allocation processor which transmits, as information suggesting allocation, the vehicle allocation request information acquired by the vehicle allocation request information acquiring section to the vehicle communication terminals mounted on allocable vehicles, based on the vehicle information stored in the vehicle information storage; a discount information calculation section which calculates discount information concerning a discount rate to a charge for use of each of the allocable vehicles, based on at least one of the vehicle information and the driving status information stored in the vehicle information storage, and also based on the vehicle allocation request information acquired by the vehicle allocation request information acquiring section; and a storage which stores the discount information calculated by the discount information calculation section, with the discount information linked to the vehicle allocation request information used for calculating the discount information and kept transmittable to the vehicle communication terminals mounted on the allocable vehicles or to a payment processor which executes a payment processing for charges for the vehicles.

According to still another aspect of the present invention, a vehicle allocation processing system executes a vehicle allocation processing of allocating vehicles to customers in accordance with requests from the customers, and includes: any of the vehicle allocation processing apparatuses according to the foregoing aspects of the present invention; a vehicle communication terminal mounted on each of the vehicles and capable of transmitting/receiving information; and a communication section enabling transmission/reception of information between the vehicle allocation processor and the vehicle communication terminal of each of the vehicles.

According to still another aspect of the present invention, a vehicle allocation processing system executes a vehicle allocation processing of allocating vehicles to customers in accordance with requests from the customers, and includes: any of the vehicle allocation processing apparatuses according to the foregoing aspects of the present invention; a vehicle communication terminal mounted on each of the vehicles and capable of transmitting/receiving information; a communication terminal which transmits vehicle allocation request information concerning a vehicle requested by a customer; and a communication section enabling transmission/reception of information among the vehicle allocation processor, the vehicle communication terminal of each of the vehicles, and the communication terminal.

According to still another aspect of the present invention, a vehicle allocation processing method for executing a vehicle allocation processing of allocating vehicles to customers in accordance with requests from the customers includes steps of: acquiring driving status information concerning driving states of the vehicles, from vehicle communication terminals mounted on the vehicles and capable of transmitting/receiving information; storing the acquired driving status information linked to vehicle information concerning the vehicles; acquiring vehicle allocation request information concerning the vehicle requested by the customer and including customer delivery position information concerning a delivery position to which the customer requests delivery, and customer destination information concerning a destination at which the customer aims; searching for allocable vehicles, based on the acquired vehicle allocation request information and the stored vehicle information and driving status information; and transmitting, as information suggesting allocation, the vehicle allocation request information to the vehicle communication terminals mounted on the allocable vehicles, based on the stored vehicle information corresponding to the allocable vehicles.

According to still another aspect of the present invention, a vehicle allocation processing method for executing a vehicle allocation processing of allocating vehicles to customers in accordance with requests from the customers includes steps of: acquiring driving status information concerning driving states of the vehicles, from vehicle communication terminals mounted on the vehicles and capable of transmitting/receiving information; storing the acquired driving status information linked to vehicle information concerning the vehicles; recognizing an input manipulation made by the customer, to acquire vehicle allocation request information concerning the vehicle requested by the customer and including customer delivery position information concerning a delivery position to which the customer requests delivery; searching for allocable vehicles, based on the acquired vehicle allocation request information, and the stored vehicle information and driving status information; and processing at least one of delivery time information concerning delivery time required for delivering each of the allocable vehicles and calculated on the basis of the stored driving status information corresponding to each of the allocable vehicles and the customer delivery position information included in the acquired vehicle allocation request information, and the stored vehicle information corresponding to each of the allocable vehicles, to make at least one of the delivery time information and the vehicle information reportable to the customer, to suggest the customer to select a particular vehicle, then recognizing the selection of the particular vehicle by recognizing an input manipulation made by the customer, and transmitting, as information suggesting allocation, the acquired vehicle allocation request information, to the vehicle communication terminal mounted on the particular vehicle, based on the vehicle information corresponding to the particular vehicle.

According to still another aspect of the present invention, a vehicle allocation processing method for executing a vehicle allocation processing of allocating vehicles to customers in accordance with requests from the customers includes steps of: acquiring driving status information concerning driving states of the vehicles, from vehicle communication terminals mounted on the vehicles and capable of transmitting/receiving information; storing the acquired driving status information linked to vehicle information concerning the vehicles; acquiring vehicle allocation request information concerning the vehicle requested by the customer and including customer delivery position information concerning a delivery position to which the customer requests delivery; transmitting, as information suggesting allocation, the acquired vehicle allocation request information to the vehicle communication terminals mounted on allocable vehicles, based on the stored vehicle information; calculating discount information concerning a discount rate to a charge for use of each of the allocable vehicles, based on at least one of the stored vehicle information and the driving status information, and the acquired vehicle allocation request information; and storing the calculated discount information linked to the vehicle allocation request information used for calculating the discount information and kept transmittable to the vehicle communication terminals mounted on the allocable vehicles or to a payment processor which executes a payment processing for settling charges for the vehicles.

According to still another aspect of the present invention, a vehicle allocation processing program makes a computer execute any of the vehicle allocation processing methods according to the foregoing aspects of the present invention.

According to still another aspect of the present invention, a recording medium records the vehicle allocation processing program according the foregoing aspect of the present invention, to be readable from the computer.

BRIEF DESCRIPTION OF THE DRAWINGS

FIGS. 3A and 3B are tables each showing a data configuration of a database in an embodiment;

FIG. 7 is a view showing an example of listed information displayed on the cellular phone in the embodiment.

DETAILED DESCRIPTION OF PREFERRED EMBODIMENT(S)

An embodiment of the present invention will now be described based on the drawings.

[Structure of Vehicle Allocation Processing System]

Figure 1:
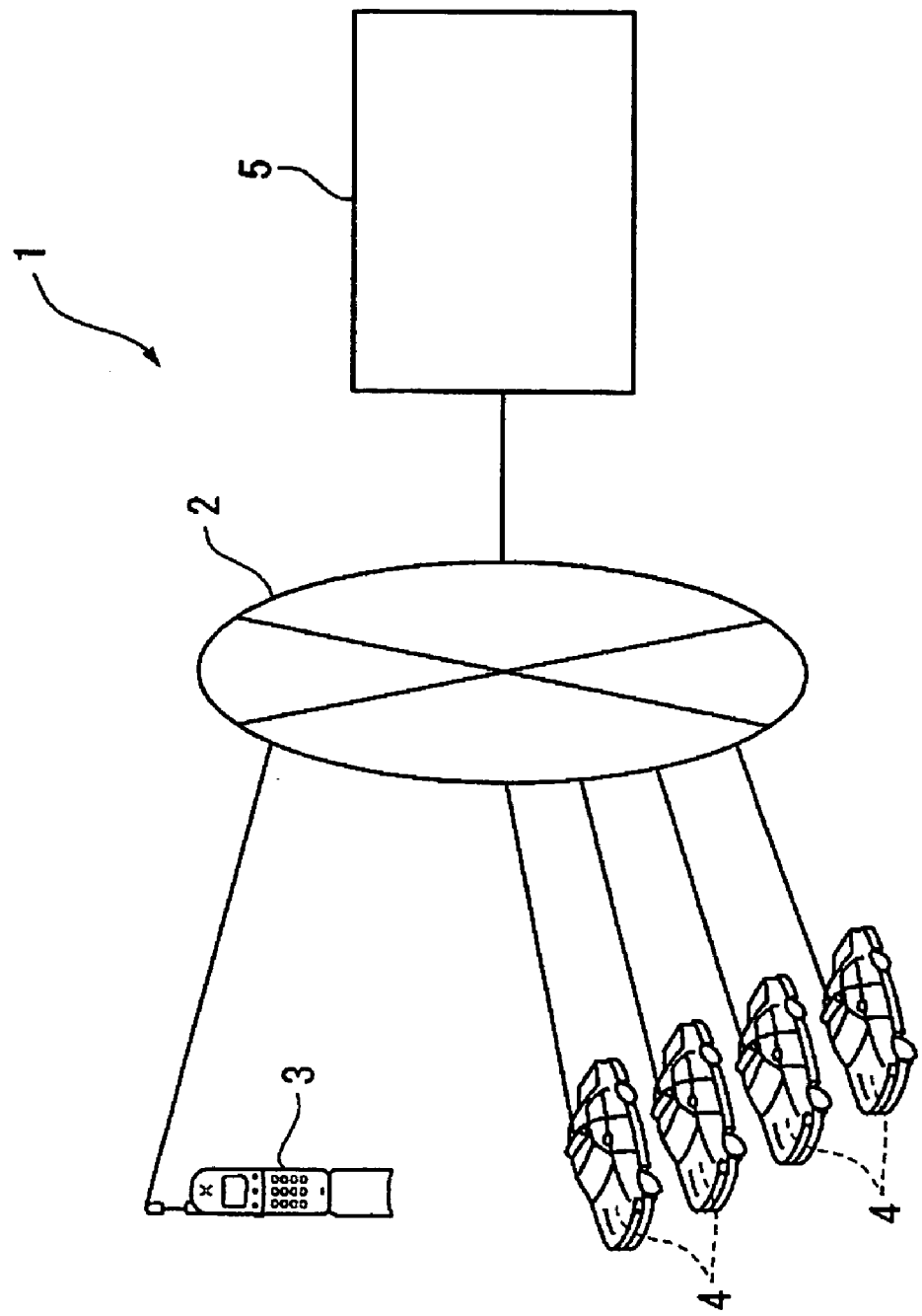
FIG. 1 is a block diagram schematically showing the structure of a vehicle allocation processing system according to the present invention.
Figure 2:
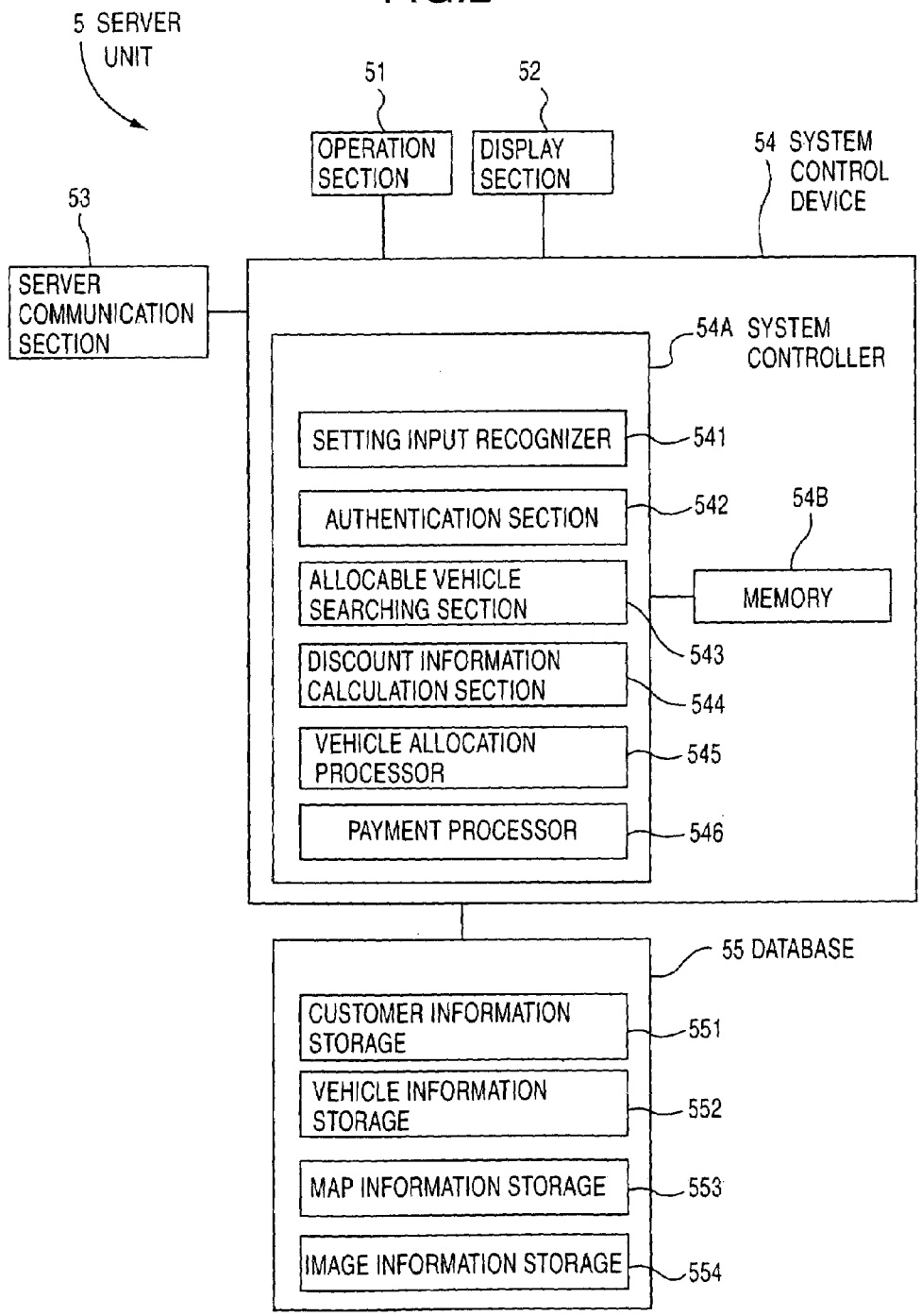
FIG. 2 is a diagram schematically showing the structure of a server unit as a vehicle allocation processing apparatus according to the present invention.

FIG. 1 is a block diagram schematically showing the structure of the vehicle allocation processing system in the present embodiment FIG. 2 is a block diagram schematically showing the configuration of a server unit forming a part of the vehicle allocation processing system.

In FIG. 1, the reference symbol 1 denotes the vehicle allocation processing system which allocates taxies as vehicles to customers in response to the customers' requests. For example, in the vehicle allocation processing system 1, a customer requests allocation of a taxi to an allocation company with use of a cellular phone as a communication terminal. The system allocates, to the customer, a taxi fit for the allocation request, and settles an electronic payment on a charge for use of the vehicle allocation service. The vehicle allocation processing system 1 has a network 2 as a communication section, a cellular phone 3, a vehicle communication terminal 4, and a server unit 5 as a vehicle allocation processing device.

The network 2 connects the cellular phone 3, the vehicle communication terminal 4, and the server unit 5 to each other, with various information kept transmittable/receivable among each other. For example, the network 2 is constructed in the form of the Internet or Intranet based on a general-purpose protocol such as TCP/IP (Transmission Control Protocol/Internet Protocol) or the like. Thus, the network 2 is connected to the vehicle communication terminal 4 and the server unit 5 to enable transmission/reception of various information among the cellular phone 3, the vehicle communication terminal 4, and the server unit 5. The network 2 is further connected to a base station not shown which receives electric waves from the cellular phone 3 to connect the cellular phone 3 to the network 2.

The cellular phone 3 is owned by a customer and has a computer body, an internal memory, a display device, an input device, and the like, though not shown. Application software programs such as browser software to browse homepages and the like on the Internet that is the network 2, E-mail software, and the like are installed in the cellular phone 3, and various information can be transmitted/received via the base station not shown and the network 2.

The internal memory of the cellular phone 3 stores a communication terminal identification information as customer identification information specific to this cellular phone 3, and also stores information received via the network 2. For example, the communication terminal identification information is identification information specific to the cellular phone 3, and may be the serial number, phone number, or E-mail address of the cellular phone 3, or a password to confirm the owner of the cellular phone 3. The identification information, however, is not limited to these items.

The communication terminal is not limited to a cellular phone but a mobile terminal such as a PDA (Personal Digital Assistants) or the like may be used. Further, not only mobile terminals of this kind but also personal computers connectable to the network 2 may be used.

The vehicle communication terminal 4 is mounted on a taxi owned by the allocation company, and has a computer body, a current position measuring device, an internal memory, a display device, an input device, and the like, though not shown. The current position measuring device measures the current position of the taxi, and calculates vehicle current position information indicative of the current position. The input device is inputted with operating status information indicative of a vacant state or a charged driving state upon an input manipulation from the driver of the taxi. Also, when in the charged driving state the input device is inputted with charged driving start position information indicative of the start position of a charged drive, and charged driving destination information indicative of a destination, upon an input manipulation from the taxi driver. Further, the input device is inputted with charge amount information concerning the charge corresponding to use by the customer, upon an input manipulation from the taxi driver. The computer body calculates driving status information, lining the vehicle current position information, the operating status information, the charged driving start position information, and the charged driving destination information to each other. Also, the computer body links the charge amount information to the communication terminal identification information concerning the customer who uses the taxi, and calculates use complete information. Further, at a predetermined cycle or upon a manipulation from the taxi driver, the vehicle communication terminal 4 transmits the driving status information and the use complete information to the server unit 5 via the network 2. Also, the vehicle communication terminal 4 receives appropriately predetermined information from the server unit 5.

As the current position measuring device, it is possible to use a device which measures the current position by receiving navigational electric waves from GPS satellites by means of a GPS (Global Positioning System) receiver. Also, as the current position measuring device, it is possible to use a device which has a velocity sensor to detect the driving velocity and the acceleration of the vehicle, an azimuthal sensor to detect the driving direction of the vehicle and the like and which measures the current position of the vehicle, based on the information such as the driving velocity, acceleration, driving direction, and the like of the vehicle. Further, as the vehicle communication terminal 4, it is possible to use a vehicle navigation device which can transmit/receive information, a cellular phone, a PDA, a personal computer, or the like which can measure the current position.

The server unit 5 is constructed, for example, as a WWW (World Wide Web) server connected to the network 2. The server unit 5 opens a vehicle allocation order homepage (vehicle allocation request screen) on the network 2, and suggests each customer to input vehicle allocation request information concerning the taxi which the customer requests. Further, the server unit 5 acquires vehicle allocation request information, and sends a vehicle allocation command to the vehicle communication terminal 4 mounted on the taxi, based on the acquired vehicle allocation request information, to allocate the taxi to the customer. The server unit 5 has an operation section 51, a display section 52, a server communication section 53, a system control device 54, and a database 55, as shown in FIG. 2.

The operation section 51 is, for example, constructed by a keyboard, a mouse, and the like, and has various operation buttons not shown which are manipulated for input operations. By manipulating these operation buttons, the server unit 5 can be operated appropriately, the contents of operations of the server unit 5 and information to be stored in the database 55 are set and inputted, for example, with respect to information displayed on the display section 52. Further, predetermined operation signals are outputted appropriately to a system controller 54A from the operation section 51, by making input manipulations on the operation section 51 by a user.

The way of setting and inputting various conditions via the operation section 51 is not limited to the input manipulations on the operation buttons but may be configured to be made, for example, by input manipulations via a touch panel, input operations based on voices, and the like.

The display section 52 is controlled by the system controller 54A and displays predetermined images. For example, when information to be stored in the database 55 is set and inputted or updated by an input manipulation on the operation section 51, data in the database 55 to be outputted from the system controller 54A is displayed. For the display section 52, it is possible to use, for example, liquid crystal or organic EL (electroluminescence), a PDP (Plasma Display Panel), a CRT (Cathode-Ray Tube), or the like.

The server communication section 53 transmits/receives signals to/from the network 2. The server communication section 53 is connected to the system controller 54A, and outputs received signals to the system controller 54A Also, the section 53 outputs signals outputted from the system controller 54A to the network 2.

The vehicle allocation request information acquisition section, the driving status information acquisition section, and the use complete information acquisition section according to the present invention correspond to the server communication section 53.

The system control device 54 performs various processings on information transmitted/received to/from the network 2 via the server communication section 53 by executing various programs. The system control device 54 has the system controller 54A and a memory 54B as a storage.

The system controller 54A has, as programs expanded over the OS (Operating System), a setting input recognizer 541, an authentication section 542, an allocable vehicle searching section 543, a discount information calculation section 544, a vehicle allocation processor 545, and a payment processor 546.

When a connection signal is inputted from the cellular phone 3 of a customer via the network 2, the setting input recognizer 541 makes the display device of the customer's cellular phone 3 display a vehicle allocation request screen which suggests the customer to input vehicle allocation request information concerning the taxi which the customer requests. The setting input recognizer 541 recognizes the customer's execution of a predetermined input manipulation by the cellular phone 3, and then, receives vehicle allocation request information including communication terminal identification information, from the cellular phone 3 via the server communication section 53. For example, the vehicle allocation request information may be not only the communication terminal identification information but also customer vehicle delivery position information concerning the vehicle delivery position to which the customer requests delivery, information concerning a destination at which the customer aims, delivery time at which the customer requests delivery (e.g., time calculated from the current time or based on normal time), or customer request service information concerning the contents of services (e.g., the vehicle size, smoking allowed or not, gender of the driver) which the customer requests about the vehicle.

The authentication section 542 compares the communication terminal identification information (e.g., a serial number, the phone number or E-mail address of the cellular phone 3, or a password) received via the server communication section 53 by the setting input recognizer 541 with customer specific information stored in the database 55, to authenticate the received communication terminal identification information.

After the communication terminal identification information is authenticated by the authentication section 542, the allocable vehicle searching section 543 searches for allocable taxies, based on the vehicle allocation request information received by the setting input recognizer 541 via the server communication section 53, and the vehicle information and driving status information stored in the database 55.

The discount information calculation section 544 calculates discount information concerning the discount rate of the charge when the customer uses the taxi, based on the vehicle allocation request information received by the setting input recognizer 541 via the server communication section 53, and at least one of the vehicle information and the driving status information which are stored in the database 55 and correspond to the taxi sought by the allocable vehicle searching section 543. In addition, the discount information calculation section 544 stores, into the memory 54B, the calculated discount information and the information used for calculating the discount information, linked to each other. For example, the discount information may be a discount rate, a discount amount with respect to the charge, points given to the customer who uses the taxi allocation, or the like.

The vehicle allocation processor 545 creates listed information including the discount information stored in the memory 54B, and makes the crated listed information displayed on the display device of the customer's cellular phone 3, to suggest the customer to select a particular taxi. The vehicle allocation processor 545 recognizes an input manipulation on the cellular phone 3 by the customer, via the setting input recognizer 541, thereby to recognize that a particular taxi has been selected. Also, the vehicle allocation processor 545 searches for the vehicle communication terminal 4 of the selected taxi, based on the vehicle information stored in the database 55. Further, the section 545 transmits vehicle allocation instruction information including vehicle allocation request information to the sought vehicle communication terminal 4, to suggest allocation of the particular taxi via the network 2.

After the vehicle allocation processing is executed by the vehicle allocation processor 545, the payment processor 546 receives use complete information linked to charge amount information concerning the charge of the taxi and the communication terminal identification information, from the vehicle communication terminal 4 of the taxi used by the customer. Further, the payment processor 546 executes an electronic payment processing, based on the customer specific information corresponding to the communication terminal identification information and the charge amount information of the received use complete information, which are stored in the database 55. After execution of the electronic payment processing, the payment processor 546 stores the discount information corresponding to the communication terminal identification information of the received use complete information stored in the memory 54B, into the database 55 together with the customer specific information.

The memory 54B is constructed by, for example, a rewritable RAM or the like and stores a predetermined program to make the system controller 54A execute a processing. Also, the memory 54B stores information including the discount information outputted from the discount information calculation section 544.

The database 55 has, for example, an optical disk, magnetic disk, or the like, and stores information outputted from the system controller 54A. The database 55 also has a customer information storage 551, a vehicle information storage 552, a map information storage 553, and an image information storage 554. FIGS. 3A and 3B respectively show data configurations in the customer information storage 551 and the vehicle information storage 552.

As shown in FIG. 3A, the customer information storage 551 is constructed by a customer data table including plural items of customer specific information created by the system controller 54A for respective customers, and plural point totals as discount information linked to the customer specific information. For example, the system controller 54A receives, via the network 2, the name, member ID, password, serial number, E-mail address, residential address, cellular phone number, credit card number, card expiration date, and the like, which are inputted via a cellular phone 3 or personal computer by each customer who desires registration. Based on these information items, the system controller 54A creates the customer specific information. Further, the system controller 54A stores the created customer specific information into the customer information storage 551 of the database 55. Also, the system controller 54A stores the total of points as discount information linked to the customer specific information, into the customer information storage 551 of the database 55, and updates the total of points in the customer information storage 551 in accordance with use of any taxi, for every customer.

As shown in FIG. 3B, the vehicle information storage 552 is constructed by a taxi management table including plural information items respectively for taxies, which are created by the system controller 54A. For example, when a user carries out an input manipulation on the operation section 51, the system controller 54A detects an operation signal from the operation section 51, and hence calculates vehicle information concerning a taxi owned by the vehicle allocation company, such as the number of the taxi, the E-mail address of the vehicle communication terminal 4 mounted on the taxi, and the like. The system controller 54A stores the driving status information (e.g., the vehicle current position information, operating status information, charged driving start position information, and charged driving destination information) received from the vehicle communication terminal 4 via the server communication section 53, into the vehicle information storage 552 in the database 55, linked to the vehicle information. The system controller 54A appropriately updates the driving status information in the vehicle information storage 552 as the driving status information is received from the vehicle communication terminal 4.

The map information storage 553 stores map information. The map information includes not only map data constructed by intersection data, road data, node data, link data, and the like but also facility data as facility information concerning shops and the like. The map data is constructed by a number of blocks as unit areas into which the whole map is divided and to which map files are respectively assigned.

The image information storage 554 stores image information to be published in real time on the network 2. The image information storage 554 stores, as the image information, for example, image data concerning the homepage opened on the network 2, image data corresponding to the vehicle allocation request screen described previously, and the like.

[Operation of Vehicle Allocation Processing System]

Figure 4:
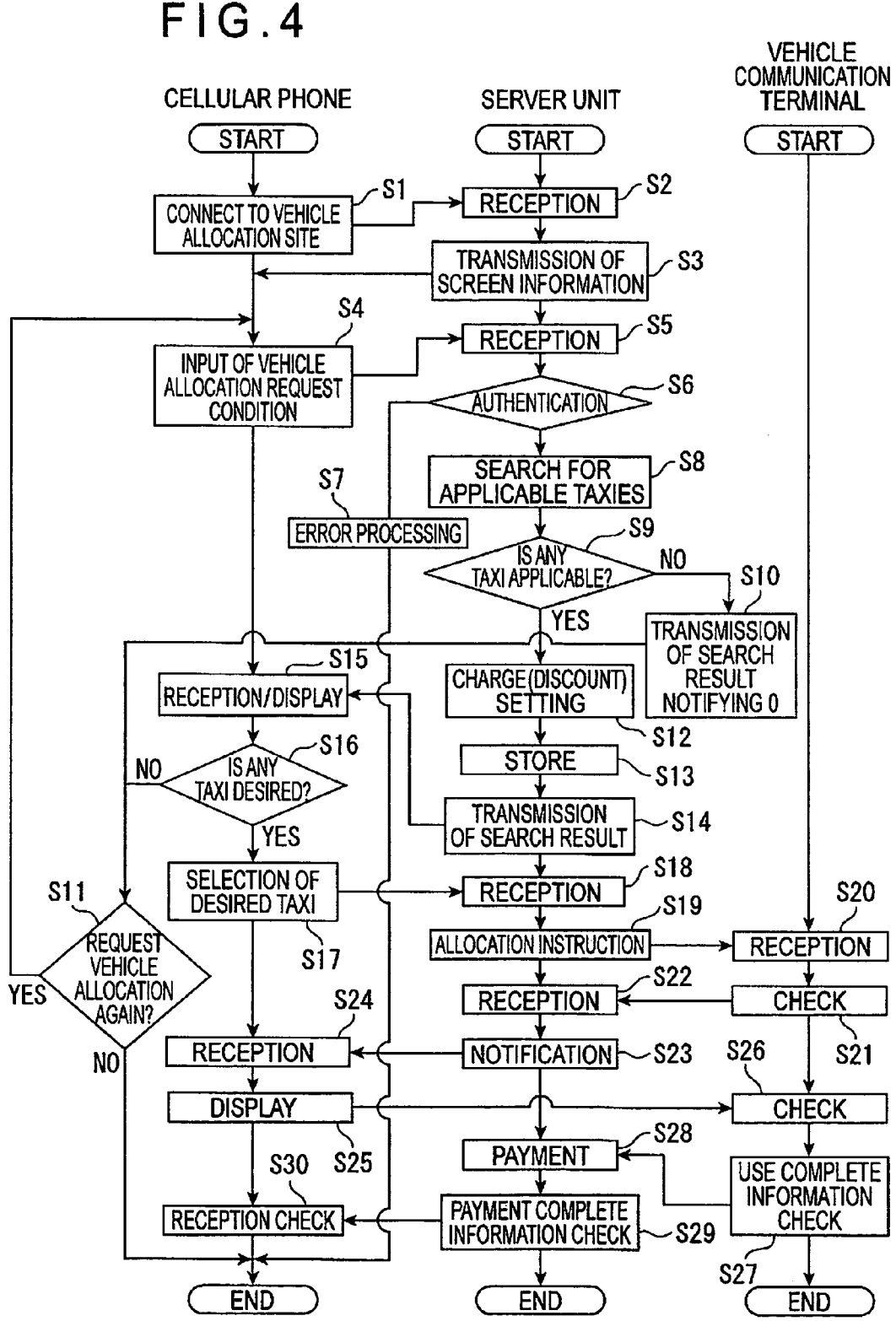
FIG. 4 is a flowchart which explains the operation of a vehicle allocation processing in the vehicle allocation processing system in the embodiment.

Next, the operation of the vehicle allocation processing system 1 described above will be described with reference to FIGS. 1 to 4. FIG. 4 is a flowchart which explains the operation of the vehicle allocation processing in the vehicle allocation processing system 1. Note that the system controller 54A appropriately updates the driving status information in the vehicle information storage 552 in the database 55. The driving status can be checked in real time from the driving status information in the vehicle information storage 552.

At first, a customer manipulates the cellular phone 3 to output a connection signal to the server unit 5 via the network 2 (step S1). The system controller 54A of the server unit 5 inputs the connection signal from the cellular phone 3 via the server communication section 53 (step S2).

Figure 5:
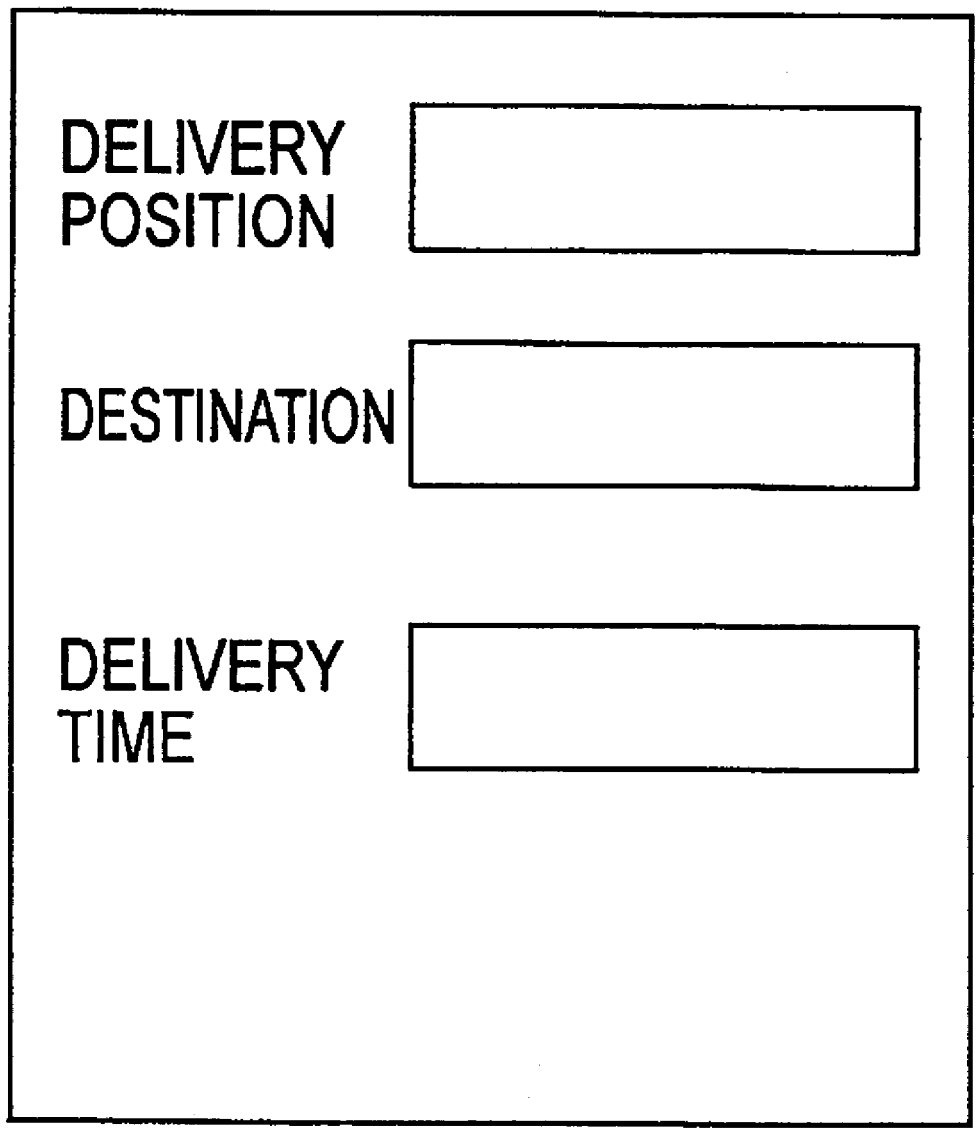
FIG. 5 is a view showing an example of a vehicle allocation request screen displayed on a cellular phone in the embodiment.

In the step S2, after the server unit 5 inputs the connection signal from the cellular phone 3, the setting input recognizer 541 of the system controller 54A sends image data stored in the image information storage 554 and corresponding to a vehicle allocation request screen, to the customer's cellular phone 3 via the network 2, to make the vehicle allocation request screen displayed on the display device of the cellular phone 3 (step S3). More specifically, FIG. 5 shows an example of the vehicle allocation screen displayed on the display device of the cellular phone 3. The vehicle allocation request screen is a screen which suggests the customer to input vehicle allocation request information including, for example, a delivery position, destination, and delivery time which the customer requests, as shown in FIG. 5.

Figure 6:
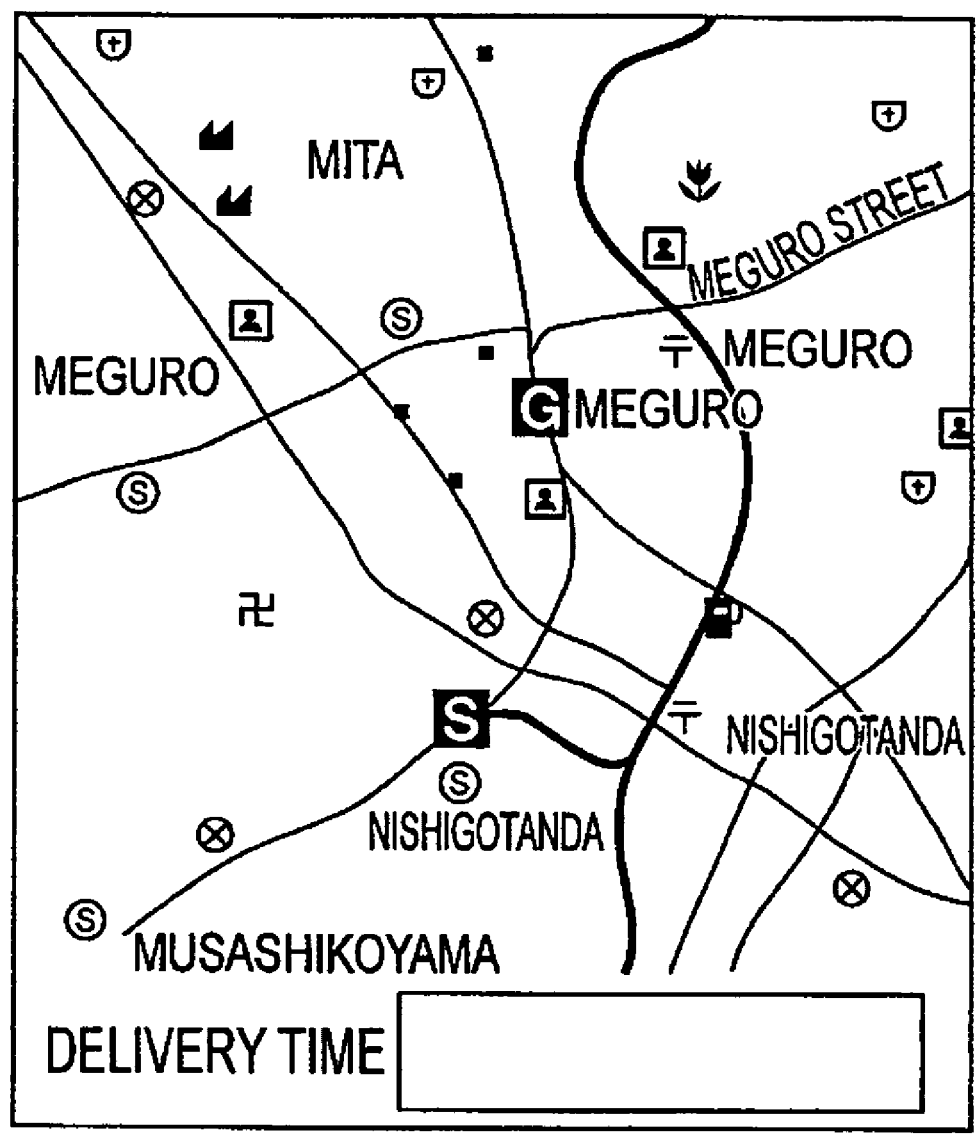
FIG. 6 is a view showing another example of the vehicle allocation request screen displayed on the cellular phone in the embodiment.

The vehicle allocation request screen is not limited to the example shown in FIG. 5 but may be formed of a screen including map information. More specifically, FIG. 6 shows another example of the vehicle allocation request screen displayed on the cellular phone 3. In the step S3, the setting input recognizer 541 transmits the map information stored in the map information storage 553 in the database 55 and the information superimposing thereon the image data corresponding to the vehicle allocation request screen stored in the image information storage 554 in the database 55, to the customer's cellular phone 3 via the network 2 and displays the information on the display device of the cellular phone 3. As shown in FIG. 6, this information is formed of map information including a point S indicative of the delivery position and a point G indicative of the destination which are requested from the customer, on a map within a predetermined range, and an image which suggests the customer to input the vehicle allocation request information such as the delivery time and the like.

In the step S3, the vehicle allocation request screen is displayed on the display device of the cellular phone 3. The customer then manipulates the input device of the cellular phone 3 to input desired positions and time, as the delivery position, destination, and delivery time as shown in FIG. 5 (step S4). The information items inputted as the delivery position and destination are not limited particularly but may be any information so far as a certain position can be recognized from the information. For example, the information to be inputted as the delivery position or destination may be information such as a place name, building name, residential address, a phone number of a building, or the like. If the cellular phone 3 is of a type having a GPS function capable of measuring the current position, the structure may be arranged such that delivery position information concerning latitude and longitude is transmitted.

If the information shown in FIG. 6 is displayed on the display device of the cellular phone 3 in the step S3. In the step S4, the customer then manipulates the input device of the cellular phone 3 to set the points S and G in the map information shown in FIG. 6, respectively positioned at the requested delivery position and destination. Also, the customer manipulates the input device of the cellular phone 3 to input desired time as the delivery time shown in FIG. 6.

If the input manipulation on the cellular phone 3 is carried out by the customer in the step S4, the setting input recognizer 541 then recognizes the input manipulation and receives vehicle allocation request information including a serial number as communication terminal identification information stored in the internal memory in the cellular phone 3, from the cellular phone 3 via the server communication section 53 (step S5).

After the vehicle allocation request information is received in the step S5, the authentication section 542 of the system controller 54A compares the communication terminal identification information included in the vehicle allocation request information with the customer specific information stored in the customer information storage 551 in the database 55. Further, whether the customer has completed registration which enables use of electronic payment by the cellular phone 3 or not is determined (step S6). If "NG" is determined in the step S6, a payment processing using the cellular phone 3 cannot be carried out, and a predetermined processing to stop allocation of a taxi is executed (step S7).

Alternatively, if "OK" is determined in the step S6, i.e., if the customer has completed the registration, the allocable vehicle searching section 543 searches for allocable taxies, based on the received vehicle allocation request information and the vehicle information and driving status information stored in the vehicle information storage 552 in the database 55 (step S8).

More specifically, the allocable vehicle searching section 543 firstly determines, for every information items of all taxies stored in the vehicle information storage 552 in the database 55, whether the taxi is in a vacant state or a charged driving state from the operating status information included in the driving status information.

With respect to those taxies that are determined as being in the vacant state (hereinafter referred to as vacant taxies), a vehicle delivery distance from the current position of each vacant taxi to the delivery position requested by the customer at the time of delivering the vacant taxi is calculated, based on the vehicle current position information included in the driving status information and the customer vehicle delivery position information included in the vehicle allocation request information. The vehicle delivery distance is obtained by calculating the distance which each vacant taxi drives along a predetermined road route, based on the map information stored in the map information storage 553 in the database 55. Note that the vehicle delivery distance may be not only the calculation method of using map information but also may be a method of calculating a linear distance between two points based on the vehicle current position information and the customer vehicle delivery position information. Further, the allocable vehicle searching section 543 divides the calculated vehicle delivery distance by a predetermined estimated vehicle driving velocity, to calculate delivery time required for delivering each vacant taxi to the delivery position requested by the customer from the current position of the vacant taxi.

Alternatively, with respect to those taxies that are determined as being in the charged driving state (hereinafter referred to as charged driving taxies), a vehicle delivery distance from the current position of each charged driving taxi to the delivery position requested by the customer via the destination of the charged driving at the time of delivering the charged driving taxi is calculated, based on the vehicle current position information, charged driving destination information and the customer vehicle delivery position information included in the driving status information. The vehicle delivery distance may adopt the calculation method of using map information, as described above. Further, the allocable vehicle searching section 543 divides the calculated vehicle delivery distance by a predetermined estimated vehicle driving velocity, to calculate delivery time required for delivering each charged driving taxi to the delivery position requested by the customer from the current position of the charged driving taxi.

Thereafter, the allocable vehicle searching section 543 compares the delivery time of each of the vacant taxies and charged driving taxies with a predetermined threshold value, to search for a taxi as an allocable taxi whose delivery time is equal to or shorter than the threshold value. As a result of the search, the allocable vehicle searching section 543 determines whether there is any applicable taxi or not (step S9). If "No" is determined in the step S9, search result information indicative of no applicable taxi is transmitted to the cellular phone 3 via the network 2 (step S10), and is displayed on the display device of the cellular phone 3. Further, the customer is suggested again to set and input the vehicle allocation request information by an input manipulation on the cellular phone 3 (step S11).

Otherwise, if "Yes" is determined in the step S9, i.e., if it is determined there is any applicable taxi, the discount information calculation section 544 calculates discount information concerning the discount rate to the charge amount which is charged when the allocable taxi sought in the step S8 by the allocable vehicle searching section 543 is used (step S12).

More specifically, the discount information calculation section 544 compares the delivery time of the taxi calculated by the allocable vehicle searching section 543 (hereinafter referred to as vehicle delivery time) with the delivery time requested by the customer and based on the customer delivery time information included in the received vehicle allocation request information (hereinafter referred to as customer request delivery time). For example, the discount information calculation section 544 subtracts the customer request delivery time from the vehicle delivery time, to calculate subtraction-result time. Further, the discount information calculation section 544 calculates discount information corresponding to the calculated subtraction-result time, according to discount information (discount rate or total of points) which is preset corresponding to predetermined subtraction-result time.

After the discount information is calculated in the step S12, the discount information calculation section 544 stores, into the memory 54B, the calculated discount information, the serial number included in the vehicle allocation request information used for the calculation, and the vehicle delivery time calculated by the allocable vehicle searching section 543, linked to each other (step S13).

After the step S13, the vehicle allocation processor 545 edits the vehicle delivery time and discount information (discount rate) stored in the memory 54B, to create listed information, and sends the created listed information to the customer's cellular phone 3 via the network 2 (step S14). Further, the customer's cellular phone 3 receives listed information, and the listed information is displayed on the display device of the cellular phone 3 (step S15). More specifically, FIG. 7 shows an example of the listed information displayed on the cellular phone 3. The listed information is formed, including information concerning the number of allocable taxies, items indicative of vehicle delivery time and discount rates as discount information to the charge, respectively for the allocable taxies, and an item indicative of no taxi desirable, as shown in FIG. 7. Thus, the listed information is to suggest the customer to select a particular taxi.

After the step S15, the customer determines whether a taxi about which the customer desires allocation is included in the listed information displayed on the cellular phone 3 or not (step S16). If "No" is determined in this step S16, i.e., if the customer determines there is no taxi desirable for allocation, the customer manipulates the input device of the cellular phone 3 to move the cursor CS shown in FIG. 6 and selects the item of "No Taxi Desirable". Further, the setting input recognizer 541 of the server unit 5 makes the vehicle allocation request screen displayed again on the display device of the customer's cellular phone 3, to suggest the customer to set and input again the vehicle allocation request information by an input manipulation on the cellular phone 3 (step S11). Then, the customer manipulates the input device of the cellular phone 3 and determines whether the customer will carry out setting and inputting of the vehicle allocation request information again or not. If "Yes", the customer sets and inputs the vehicle allocation request information. Otherwise, if "No", the order of allocation of a taxi ends.

Otherwise, if "Yes" is determined in the step S16, i.e. if there is a taxi desirable for allocation, the customer manipulates the input device of the cellular phone 3 to move the cursor CS shown in FIG. 6 and to select an item indicative of a particular one among the allocable taxies (step S17).

If the input manipulation of selecting a particular taxi is carried out in the step S17, an operation signal corresponding to the customer's input manipulation on the cellular phone 3 is received via the server communication section 53 (step S18). By thus receiving the operation signal, the setting input recognizer 541 recognizes the customer's input manipulation on the cellular phone 3. Upon recognition of the input manipulation by the setting input recognizer 541, the vehicle allocation processor 545 recognizes that a particular taxi is selected. Also, the vehicle allocation processor 545 searches for the vehicle communication terminal 4 of the selected taxi, based on the vehicle information stored in the vehicle information storage 552 in the database 55. Further, the vehicle allocation processor 545 transmits vehicle allocation instruction information including vehicle allocation request information and a reservation number to use the taxi allocation, to the sought vehicle communication terminal 4, for example, via E-mail through the network 2 (step S19), to suggest the allocation to the selected taxi.

After the step S19, the vehicle communication terminal 4 receives the vehicle allocation instruction information via the network 2 from the server unit 5 (step S20). The driver of the taxi who has received the vehicle allocation instruction information checks the information and manipulates the vehicle communication terminal 4 to send a signal indicative of the vehicle allocation instruction information confirmed, to the server unit 5 via the network 2 (step S21).

After the step S21, the server unit 5 receives the signal indicative of the confirmed vehicle allocation instruction information via the network 2 from the vehicle communication terminal 4 (step S22). Upon receipt of the signal indicative of the vehicle allocation instruction information, the server unit 5 transmits the reservation number transmitted to the vehicle communication terminal 4, to the cellular phone 3 via the network 2 (step S23).

After the step S23, the customer's cellular phone 3 receives the reservation number via the network 2 from the server unit 5 (step S24). Further, the customer checks the received reservation number on the display device of the cellular phone 3, which stores the received reservation number into the internal memory.

When the vehicle delivery time selected among the items displayed in the listed information expires, the selected taxi is delivered to the delivery position which the customer has requested. The customer then manipulates the cellular phone 3 to display the reservation number stored in the internal memory, on the display device (step S25), and suggests the taxi driver to confirm the reservation number. The taxi driver compares the reservation number displayed on the customer's cellular phone 3 with the reservation number included in the vehicle allocation instruction information received from the server unit 5 in the step S20, to check the customer who has ordered the vehicle allocation (step S26).

After the step S26, the taxi driver transports the customer to the destination requested by the customer at the customer's charge, based on the customer destination information of the vehicle allocation request information included in the vehicle allocation instruction information received from the server unit 5 in the step S20. After the charged transportation to the destination requested by the customer, the taxi driver makes an input manipulation on the input device of the vehicle communication terminal 4, to set and input charge amount information concerning the charge for the use of the taxi. Further, the computer body of the vehicle communication terminal 4 links the set and inputted charge amount information to the serial number in the vehicle allocation request information included in the vehicle allocation instruction information received from the server unit 5 in the step 20, and calculates use complete information. Then, the computer body transmits the calculated use complete information to the server unit 5 via the network 2 (step S27).

After the step S27, the server unit 5 receives the use complete information from the vehicle communication terminal 4 via the network 2. Further, the payment processor 546 of the server unit 5 executes an electronic payment processing, based on the customer specific information corresponding to the serial number stored in the customer information storage 551 in the database 55 and included in the received use complete information, and the charge amount information included in the received use complete information (step S28).

More specifically, the payment processor 546 connects to, for example, a management server not shown but managed by a credit-card company via the network. Further, the payment processor 546 checks validity of a credit card, based on the customer specific information (credit card number, expiration date of the card, and the like) corresponding to the serial number included in the received use complete information (credit check). After the credit check, a payment via the credit card company is settled, based on the customer specific information corresponding to the serial number included in the received use complete information, and the charge amount information included in the received use complete information.

After completing the payment processing, the payment processor 546 adds the discount information (points) stored in the memory 54B and corresponding to the serial number included in the received use complete information, to the total of points stored in the customer information storage 551 in the database 55 and corresponding to the serial number included in the received use complete information, to update the total of points.

After the step S28, the payment processor 546 transmits payment complete information indicative of the completed payment processing, to the customer's cellular phone 3, for example, by an E-mail via the network 2 (step S29).

The customer's cellular phone 3 then receives the payment complete information, and the customer confirms the completed electronic payment processing on the display device of the cellular phone 3 (step S30). Note that the transmission of the payment complete information is not limited to an E-mail but may be arranged such that the payment complete information is sent by a postal mail based on the customer's residential address stored in the customer information storage 551 in the database 55.

[Advantages of the Embodiment]

(1) The server unit 5 as the vehicle allocation processing apparatus described above executes a vehicle allocation processing of allocating taxies as vehicles to customers in accordance with requests from the customers, and includes: a driving status information acquiring section which acquires driving status information concerning driving states of the taxies, from vehicle communication terminals 4 mounted on the taxies and capable of transmitting/receiving information; a vehicle information storage 552 which stores the driving status information acquired by the driving status information acquiring section, with the driving status information linked to vehicle information concerning the taxies; a vehicle allocation request information acquiring section which acquires vehicle allocation request information concerning a taxi requested by a customer and including customer delivery position information concerning a delivery position to which the customer requests delivery, and customer destination information concerning a destination at which the customer aims; an allocable vehicle searching section 543 which searches for allocable taxies, based on the vehicle allocation request information acquired by the vehicle allocation request information acquiring section, and the vehicle information and driving status information stored in the vehicle information storage 552; and a vehicle allocation processor 545 which transmits, as information suggesting allocation, the vehicle allocation request information acquired by the vehicle allocation request information acquiring section to the vehicle communication terminals 4 mounted on the allocable taxies, based on the vehicle information stored in the vehicle information storage 552 and corresponding to the allocable taxies.

In the present embodiment, the driving status information acquiring section appropriately acquires the driving status information concerning the driving states of taxies from the vehicle communication terminals 4 mounted on the taxies. The vehicle information storage 552 stores vehicle information concerning taxies by settings and inputs previously made by users, and appropriately stores the driving status information acquired by the driving status information acquiring section, with the driving status information linked to the vehicle information. The vehicle allocation request information acquiring section acquires vehicle allocation request information concerning the taxi requested by a customer and including customer delivery position information concerning the delivery position to which the customer requests delivery of the taxi, and customer destination information concerning the destination at which the customer aims. The allocable vehicle searching section 543 searches for allocable taxies, based on the vehicle allocation request information acquired by the vehicle allocation request information acquiring section, and the vehicle information and driving status information stored in the vehicle information storage 552. Further, the vehicle allocation processor 545 transmits the vehicle allocation request information acquired by the vehicle allocation request information acquiring section to the vehicle communication terminals 4 mounted on the allocable taxies, based on the vehicle information stored in the vehicle information storage 552 and corresponding to the allocable taxies, to suggest allocation to the taxies. Therefore, the server unit 5 can manage precisely the taxies subjected to the vehicle allocation processing, from the vehicle information and driving status information stored in the vehicle information storage 552. In addition, the allocable vehicle searching section 543 can search for taxies fit for the request from the customer, from the vehicle information and driving status information stored in the vehicle information storage 552. Further, the vehicle allocation processor 545 transmits information suggesting allocation, to the allocable taxies sought by the allocable vehicle searching section 543. Therefore, the allocation processing can be executed more rapidly and the allocation efficiency is improved, compared with a system which sends vehicle allocation request information to the vehicle communication terminals 4 of every taxi and waits a response from every taxi. Thus, the server unit 5 according to the present embodiment thus improves the vehicle allocation processing.

In addition, the server unit 5 transmits the vehicle allocation request information including the customer delivery position information and the customer destination information to the vehicle communication terminals 4 mounted on the allocable taxies. Therefore, the taxi drivers check the vehicle allocation request information received by the vehicle communication terminals 4, and so can search for an optimum route in advance based on, for example, the customer delivery position information and the customer destination information. Accordingly, the charged driving period can be shortened and the allocation efficiency can be further improved. In addition, when the customer gets in an allocated taxi, the customer need not inform the taxi driver of the destination.

(2) The driving status information stored in the vehicle information storage 552 is configured to include vehicle current position information concerning a current position of each of the taxies, operating status information indicative of a vacant state and a charged driving state of each of the taxies, and charged driving destination information concerning a destination in case of the charged driving state. The allocable vehicle searching section 543 determines the vacant state or the charged driving state from the operating status information included in the driving status information stored in the vehicle information storage 552. With respect to each of vacant driving taxies which are in the vacant state, the allocable vehicle searching section 543 calculates a delivery distance from the current position of each of the vacant driving taxi to the delivery position requested by the customer, based on the vehicle current position information included in the driving status information and the customer delivery position information included in the vehicle allocation request information. On the other hand, with respect to charged driving taxies which are in the charged driving state, the allocable vehicle searching section 543 calculates the delivery distance from the current position of each of the charged driving taxies to the delivery position requested by the customer via the destination of the charged driving, based on the vehicle current position information, the charged driving destination information, and the customer delivery position information included in the driving status information. The allocable vehicle searching section 543 then divides each of the delivery distances of the vacant driving taxies and the charged driving taxies by an estimated vehicle driving velocity, to calculate the delivery time required for driving from the current position of each of these taxies to the delivery position requested by the customer. Thereafter, the allocable vehicle searching section 543 compares the delivery time of each of the vacant driving taxies and the charged driving taxies, with a predetermined threshold value, to seek those taxies each having delivery time below the predetermined threshold value, as allocable taxies. Therefore, the search can be made from not only vacant taxies but also charged driving taxies, so that allocable taxies can be sought depending on the delivery time of every of all the taxies. Thus, allocation is executed in consideration of schedules of all taxies, and the allocation efficiency can be improved much more.

In addition, the allocable vehicle searching section 543 calculates the delivery distance with use of map information stored in the map information storage 553 in the database 55. Therefore, accurate delivery distances can be calculated, and suitable taxies can be sought.

(3) The allocable vehicle searching section 543 determines whether there is any applicable taxi or not, as a result of searching for the allocable vehicles. If the allocable vehicle searching section 543 determines "No", the allocable vehicle searching section 543 transmits search result information indicative of no applicable vehicle, to the cellular phone 3 via the network 2, and makes the search result information displayed on the display device of the cellular phone 3. Therefore, the customer can determine whether the input setting of the vehicle allocation request information should be changed or not by checking the display device of the cellular phone 3. Accordingly, it is possible to let the customer take a next response, so that the allocation efficiency of taxies can be improved much more.

(4) Another server unit 5 according to the present embodiment executes a vehicle allocation processing of allocating taxies to customers in accordance with requests from the customers, and includes: a driving status information acquiring section which acquires driving status information concerning driving states of the taxies, from vehicle communication terminals 4 mounted on the taxies and capable of transmitting/receiving information; a vehicle information storage 552 which stores the driving status information acquired by the driving status information acquiring section, with the driving status information linked to vehicle information concerning the taxies; a vehicle allocation request information acquiring section which acquires vehicle allocation request information concerning a taxi requested by a customer and including customer delivery position information concerning a delivery position to which the customer requests delivery; a vehicle allocation processor 545 which transmits, as information suggesting allocation, the vehicle allocation request information acquired by the vehicle allocation request information acquiring section to the vehicle communication terminals 4 mounted on allocable taxies, based on the vehicle information stored in the vehicle information storage 552; a discount information calculation section 544 which calculates discount information concerning a discount rate to a charge for use of each of the allocable taxies, based on at least one of the vehicle information and the driving status information stored in the vehicle information storage 552, and also based on the vehicle allocation request information acquired by the vehicle allocation request information acquiring section; and a memory 54B as a storage which stores the discount information calculated by the discount information calculation section 544, with the discount information kept transmittable to the vehicle communication terminals 4 mounted on the allocable taxies or to a payment processor 546 which executes a payment processing for charges for the taxies.

In the present embodiment, the driving status information acquiring section appropriately acquires driving status information concerning driving states of the taxies, from vehicle communication terminals 4 mounted on the taxies. The vehicle information storage 552 stores, in advance, vehicle information concerning the taxies via setting inputs made by users, and also stores the driving status information acquired by the driving status information acquiring section, with the driving status information linked to the vehicle information. The vehicle allocation request information acquiring section acquires vehicle allocation request information concerning a taxi requested by a customer and including customer delivery position information concerning a delivery position to which the customer requests delivery. The vehicle allocation processor 545 transmits the vehicle allocation request information acquired by the vehicle allocation request information acquiring section to the vehicle communication terminals 4 mounted on allocable taxies, based on the vehicle information stored in the vehicle information storage 552, to suggest allocation to the taxies. At this stage, the discount information calculation section 544 calculates discount information concerning a discount rate to a charge for use of each of the allocable taxies (e.g., the discount rates to the charges, totals of points equivalent to the discount rates, and the like), based on the driving status information stored in the vehicle information storage 552, and also based on the vehicle allocation request information acquired by the vehicle allocation request information acquiring section. Further, the memory 54B stores the discount information calculated by the discount information calculation section 544, with the discount information kept readable from the payment processor 546 which executes a payment processing for charges for the taxies. Therefore, the server unit 5 can manage precisely the taxies subjected to the vehicle allocation processing, from the vehicle information and driving status information stored in the vehicle information storage 552. In addition, the discount information calculation section 544 can calculate proper discount information with respect to the vehicle allocation request information from each customer, based on the driving status information stored in the vehicle information storage 552. Further, the payment processor 546 reads the discount information stored in the memory 54B when executing the payment processing, so that the payment processing can be executed on the charges based on the discount information (discount rate). Therefore, use of taxi allocation can be promoted greatly by customers. In addition, use of taxi allocation by customers is enhanced so that the taxi allocation efficiency can be improved. That is, the vehicle allocation processing can be rationalized, according to the server unit 5 of the present embodiment.

(5) The vehicle allocation request information is configured to include customer request delivery time information concerning delivery time requested by the customer. The discount information calculation section 544 calculates the discount information concerning the discount rate to the charge for each taxi, based on the vehicle delivery time calculated by the allocable vehicle searching section 543, and the customer request delivery time requested by the customer and on the basis of the customer delivery time information included in the received vehicle allocation request information. Therefore, discount information corresponding to customer's requests can be calculated, so that the customers can find more satisfaction. The vehicle allocation processing can hence be rationalized more.

Also, the discount information calculation section 544 subtracts the customer request delivery time from the vehicle delivery time, to calculate subtraction-result time. Further, the discount information calculation section 544 calculates discount information corresponding to the calculated subtraction-result time, according to discount information which is preset corresponding to predetermined subtraction-result time. Therefore, the discount information can be calculated rapidly via a simple processing, so that the delivery efficiency can be improved.

(6) The system controller 54A of the server unit 5 has a setting input recognizer 541. The discount information calculation section 544 makes the memory 54B store the discount information (a discount rates and total of points), the vehicle delivery time calculated by the allocable vehicle searching section 543, and the serial number included in the received vehicle allocation request information, linked to each other. The vehicle allocation processor 545 edits the vehicle delivery time and discount information (discount rate) stored in the memory 54B, to create listed information. The vehicle allocation processor 545 transmits the created listed information to the customer's cellular phone 3, and makes the listed information displayed on the display device of the cellular phone 3, to suggest the customer to select a particular taxi. It is therefore possible to let each customer check both of the discount information and the delivery time about the taxi which the customer desires. Therefore, the customer can select a particular taxi so that the customer can find more satisfaction. The vehicle allocation processing can hence be rationalized more.

The listed information which suggests each customer to select a particular taxi is configured to include an item indicating that there is no desirable taxi ("No Taxi Desirable"). If the customer selects the item "No Taxi Desirable" when there is no desirable taxi listed, the customer is suggested to input and set the vehicle allocation request information again. It is thus possible to let the customer make a next response rapidly. Accordingly, the taxi allocation efficiency can be improved more.

(7) The cellular phone 3 owned by the customer stores communication terminal identification information as customer identification information, in an internal memory. The customer information storage 551 in the database 55 stores customer specific information including the communication terminal identification information and specifying the customer. Further, the setting input recognizer 541 in the system controller 54A receives the vehicle allocation request information including the communication terminal identification information from the cellular phone 3 via the network 2. At this stage, the authentication section 542 compares the communication terminal identification information included in the received vehicle allocation request information, with the customer specific information stored in the customer information storage 551 in the database 55, to authenticate the communication terminal identification information. After the communication terminal identification information is authenticated by the authentication section 542, the vehicle allocation processor 545 transmits the received vehicle allocation request information, to the vehicle communication terminal 4 mounted on the taxi which should be instructed to be allocated to the customer, via the network 2. Then, the system controller 54A receives use complete information linked to charge information concerning the charge for the taxi, and the communication terminal identification information included in the received vehicle allocation request information, via the network 2. Thereafter, the payment processor 546 in the system controller 54A executes the electronic payment processing, based on the customer specific information corresponding to the serial number included in the received use complete information, and also based on the charge information included in the received use complete information. Therefore, the server unit 5 can acquire automatically the communication terminal identification information from the cellular phone 3. As a result, the payment processing can be executed easily and rapidly without letting the customer make any special input manipulation from the cellular phone 3.

After the payment processing is completed, the payment processor 546 adds the discount information (total of points) corresponding to the serial number included in the received use complete information stored in the memory 54B, to the total of points stored in the customer information storage 551 in the database 55 and corresponding to the serial number included in the received use complete information, to update the total of points. Therefore, points can be added to the customer in accordance with use of taxi allocation. Accordingly, use of the payment processing can be promoted among the customers.

(8) A vehicle allocation processing system 1 according to the present embodiment executes a vehicle allocation processing of allocating vehicles to customers in accordance with requests from the customers, and includes a server unit 5, a vehicle communication terminal 4, and a network 2 as a communication section. Therefore, the server unit 5 can receive driving status information easily and smoothly via the network 2 from the vehicle communication terminal 4 mounted on each taxi, the current position of which moves appropriately. Accordingly, management of the taxies can be easily and properly carried out, so that the vehicle allocation processing can be rationalized.

(9) Another vehicle allocation processing system 1 according to the present embodiment executes a vehicle allocation processing of allocating vehicles to customers in accordance with requests from the customers, and includes a server unit 5, a vehicle communication terminal 4, a cellular phone 3 as a communication terminal, and a network 2. Hence, the server unit 5 acquires vehicle allocation request information from the cellular phone 3 of a type which is widely used via the network 2. This leads to improvements in usability for customers to order vehicle allocation, so that use of the present invention can be enhanced greatly. Therefore, the enhanced use of the vehicle allocation processing can improve the allocation efficiency, resulting in rationalization of vehicle allocation.

The system controller 54A of the server unit 5 is constructed to have a setting input recognizer 541. When a connection signal is inputted from the cellular phone 3, the setting input recognizer 541 makes the display device of the customer's cellular phone 3 display a vehicle allocation request screen which suggests the customer to input vehicle allocation request information including, for example, a delivery position, a destination, delivery time, and the like. It is thus possible to let the customer make an input manipulation for the vehicle allocation easily. Accordingly, the usability for customers to order taxi allocation can be improved much more.

(10) A vehicle allocation processing program according to the present embodiment makes a computer execute a vehicle allocation processing method. Hence, for example, general purpose computers can be used so that use of the present invention can be promoted greatly.

(11) A recording medium according to the present embodiment records a vehicle allocation processing program to be readable from a computer. Thus, the vehicle allocation processing program to execute a vehicle allocation processing method is recorded on a recording medium. Therefore, handling of the program is so easy that use of the present invention can be promoted greatly.

MODIFICATIONS OF THE EMBODIMENT

The present invention has been described above with reference to a preferred embodiment. The present invention, however, is not limited to the foregoing embodiment but various modifications and design changes can be made without deviating from the subject matter of the present invention.

In the foregoing embodiment, the vehicle allocation processor 545 transmits listed information which suggests selection of a particular taxi, to the cellular phone 3 via the network 2, and makes the listed information displayed on the display device of the cellular phone 3. The listed information is configured to include discount information concerning allocable vehicles, vehicle delivery time of each of the vehicles calculated by the allocable vehicle searching section 543. The present invention is not limited hitherto but may adopt the following configuration.

For example, the listed information may be formed of vehicle information, vehicle delivery time, or discount information concerning each of the allocable vehicles which are sought by the allocable vehicle searching section 543. In this configuration, the server unit 5 can suggest selection of a particular taxi to each customer, presenting minimum information to the customer. As a result, transmission of the listed information can be carried out smoothly.

Alternatively, the listed information may be formed of vehicle information, vehicle delivery time, and discount information. In this configuration, it is possible to suggest each customer to select a particular taxi based on various information. The customer can select an optimum taxi and hence can feel more satisfied.

In the foregoing embodiment, the vehicle allocation request information is configured to include customer delivery position information, customer destination information, and customer request delivery time information. The present invention is not limited hitherto but may adopt the following configuration.

For example, the vehicle allocation request information may be configured to include only the customer delivery position information and the customer request delivery time information, omitting the customer destination information. In this configuration, the amount of information can be reduced so that transmission/reception of information via the network 2 between the cellular phone 3 and the server unit 5 can be carried out smoothly.

Alternatively, for example, the vehicle allocation request information may be formed of the customer delivery position information. This is a case that a customer wants to use the taxi allocation service quickly, and the customer request delivery time information can be omitted. In this case, the allocable vehicle searching section 543 calculates vehicle delivery time, based on customer delivery position information as received vehicle allocation request information, and based on the vehicle current position information included in the driving status information stored in the vehicle information storage 552. Further, the discount information calculation section 544 calculates discount information corresponding to the calculated vehicle delivery time, from the discount information corresponding to predetermined vehicle delivery time which is preset. In this configuration, the information amount of the vehicle allocation request information can be reduced. In addition, the discount information can be calculated rapidly by a simple processing, without making a subtraction between the vehicle delivery time and the delivery time based on the customer request delivery time information, in the discount information calculation section 544.

Similarly, the vehicle allocation request information may be formed of the customer delivery position information. In this case, the allocable vehicle searching section 543 calculates a vehicle delivery distance, and searches for allocable taxies, based on the vehicle delivery distance. The discount information calculation section 544 calculates discount information corresponding to the calculated vehicle delivery distance, from the discount information corresponding to a predetermined vehicle delivery distance which is preset. In this configuration, it is possible to omit a processing of dividing the vehicle delivery distance by an estimated vehicle driving velocity, to calculate delivery time. As a result, the discount information can be calculated more rapidly by a simple processing.

Also similarly, the vehicle allocation request information may be formed of the customer delivery position information. In addition, the vehicle information stored in the vehicle information storage 552 may be configured to include not only the information explained in the foregoing embodiment but also vehicle waiting position information concerning a normal waiting position of each taxi; In this case, the allocable vehicle searching section 543 calculates a vehicle delivery distance, and searches for allocable taxies, based on the vehicle delivery distance. The discount information calculation section 544 further calculates a vacant driving distance from the current position of each allocable taxi to the waiting position of the taxi, based on vehicle waiting position information included in the vehicle information stored in the vehicle information storage 552 and corresponding to each allocable taxi, and based on the vehicle current position information. Note that the calculation of the vacant driving distance is carried out in a method similar to the calculation method for the delivery distance. Further, the discount information calculation section 544 subtracts the vehicle delivery distance calculated by the allocable vehicle searching section 543 from the calculated vacant driving distance, to calculate a subtraction-result distance. The discount information calculation section 544 further calculates discount information corresponding to the calculated subtraction-result distance, from discount information corresponding to a predetermined subtraction-result distance which is preset. For example, presetting is made such that a higher discount information (a higher discount rate) is set for a taxi having a vacant driving distance longer than a vehicle delivery distance, compared with a taxi having a vacant driving distance shorter than a vehicle delivery distance. In this configuration, customers use taxies at charges according to the discount information, so that the customers can feel more satisfied. In addition, the company which owns the taxies can gain profits if fuel consumption during the vacant driving time is taken into consideration. Therefore, the vehicle allocation processing can be rationalized.

Further, the vehicle allocation request information may be formed of, for example, the customer delivery position information and the customer request service information concerning contents of services (the vehicle size, smoking allowed or inhibited, the gender of the driver, and the like) with respect to the taxi requested by the customer. In addition, the vehicle information stored in the vehicle information storage 552 may be configured to include not only the information explained in the embodiment but also vehicle service information concerning the contents of services provided by the taxies (the vehicle size, smoking allowed or inhibited, the gender of the driver, and the like). In this case, the allocable vehicle searching section 543 may calculate a vehicle delivery distance, and may search for allocable taxies, based on the vehicle delivery distance. Alternatively, the allocable vehicle searching section 543 may search for allocable taxies, based on the number of items which comply with both of customer request service information included in the received vehicle allocation request information, and the vehicle service information included in the vehicle information stored in the vehicle information storage 552. Further, the discount information calculation section 544 calculates the number of items which comply with both of the customer request service information included in the received vehicle allocation request information, and the vehicle service information included in the vehicle information stored in the vehicle information storage 552. Further, the discount information calculation section 544 calculates discount information corresponding to the calculated number of items, from discount information corresponding to a predetermined number of items which is preset. In this configuration, the discount information can be easily calculated by simply comparing the two pieces of information.

In the foregoing embodiment, the calculation of the discount information in the discount information calculation section 544 is made on the basis of the customer destination information included in the received vehicle allocation request information. For example, the discount rate may be higher if the destination based on the customer destination information is far from the delivery position requested by the customer. In this configuration, the customer can feel more satisfied since the discount information is applied by pawning the vehicle allocation company's profit.

The foregoing embodiment may adopt a structure in which the discount information calculation section 544 of the server unit 5 is omitted. In this case, the structure of the server unit 5 can be simplified while improving the rapidness of the vehicle allocation processing.

In the foregoing embodiment, the discount information is formed of the total of points added after completion of a payment processing. The present invention is not limited hitherto but may be arranged such that the payment processing is carried out at a charge corresponding to the discount information.

In the foregoing embodiment, the server unit 5 has a structure which includes the authentication section 542 and the payment processor 546. The present invention, however, is not limited to this structure but the authentication section 542 and the payment processor 546 may be omitted. That is, each customer pays the charge for use of a taxi in cash after use of the taxi. At this time, the vehicle allocation processor 545 transmits the discount information stored in the memory 54B and the vehicle allocation instruction information including the vehicle allocation request information via the network 2, to the vehicle communication terminal 4 corresponding to the taxi which should practice the vehicle allocation instruction. In this structure, the taxi driver checks the vehicle allocation instruction information received by the vehicle communication terminal 4, so that the customer can use the taxi at a charge corresponding to the discount information.

The foregoing embodiment has been described supposing that the communication terminal is a cellular phone 3. The present invention is not limited hitherto. For example, a general-purpose personal computer capable of transmitting/receiving information may be adopted as the communication terminal. If this personal computer is placed at a vehicle allocation company, drugstore, kiosk, or the like, use of the taxi allocation service can be promoted among people who have no cellular phone 3.

In the foregoing embodiment, the setting input recognizer 541 suggests each customer, via a vehicle allocation request screen, to input vehicle allocation request information. However, if another example of the vehicle allocation request screen as shown in FIG. 6 is used, a delivery position, destination, or the like need not be inputted when the customer makes an input manipulation on the cellular phone 3 but may be set on map information.

In the foregoing embodiment, the vehicle allocation company may be constructed so as to organize management of taxies owned by plural taxi companies and practice only the processing of allocating taxies. Alternatively, the vehicle allocation company may serve as the taxi companies, and each taxi company may serve as the vehicle allocation company. In case of the former example, the taxi companies become more competitive so that the vehicle allocation efficiency can be improved much more. Alternatively, in case of the latter example, management of the taxies owned by the taxi companies can be fully managed so that the vehicle allocation processing can be practiced properly.

Furthermore, specific structures and procedures to practice the present invention may be appropriately changed into different structures so far as the object of the present invention can be achieved.

What is claimed is:

1. A vehicle allocation processing apparatus which executes a vehicle allocation processing of allocating vehicles to customers in accordance with requests from the customers, comprising:
   a driving status information acquiring section which acquires driving status information concerning driving states of the vehicles, from vehicle communication terminals mounted on the vehicles and for transmitting/receiving information;
   a vehicle information storage which stores the driving status information acquired by the driving status information acquiring section, with the driving status information linked to vehicle information concerning the vehicles;
   a vehicle allocation request information acquiring section which acquires vehicle allocation request information concerning a vehicle requested by a customer and including customer delivery position information concerning a delivery position to which the customer requests delivery, and customer destination information concerning a destination at which the customer aims;
   an allocable vehicle searching section which searches for allocable vehicles, based on the vehicle allocation request information acquired by the vehicle allocation request information acquiring section, and the vehicle information and driving status information stored in the vehicle information storage; and
   a vehicle allocation processor which transmits, as information suggesting allocation, the vehicle allocation request information acquired by the vehicle allocation request information acquiring section to the vehicle communication terminals mounted on the allocable vehicles, based on the vehicle information stored in the vehicle information storage and corresponding to the allocable vehicles.

2. The apparatus according to claim 1, further comprising a setting input recognizer which recognizes an input manipulation made by the customer, wherein
   the vehicle allocation processor processes the vehicle information stored in the vehicle information storage and corresponding to the allocable vehicles, to make the vehicle information reportable to the customer, to suggest the customer to select a particular one of the allocable vehicles, recognizes the selection of the particular vehicle by recognizing an input manipulation made by the customer via the setting input recognizer, and transmits, as the information suggesting allocation, the vehicle allocation request information acquired by the vehicle allocation request information acquiring section, to the vehicle communication terminal mounted on the particular vehicle, based on the vehicle information corresponding to the particular vehicle.

3. A vehicle allocation processing apparatus which executes a vehicle allocation processing of allocating vehicles to customers in accordance with requests from the customers, comprising:
   a driving status information acquiring section which acquires driving status information concerning driving states of the vehicles, from vehicle communication terminals mounted on the vehicles and for transmitting/receiving information;
   a vehicle information storage which stores the driving status information acquired by the driving status information acquiring section, with the driving status information linked to vehicle information concerning the vehicles;
   a setting input recognizer which recognizes input manipulations made by the customers;
   a vehicle allocation request information acquiring section which acquires vehicle allocation request information concerning a vehicle requested by a customer and including customer delivery position information concerning a delivery position to which the customer requests delivery, by recognizing an input manipulation made by the customer, via the setting input recognizer;
   an allocable vehicle searching section which searches for allocable vehicles, based on the vehicle allocation request information acquired by the vehicle allocation request information acquiring section, and the vehicle information and driving status information stored in the vehicle information storage; and
   a vehicle allocation processor which processes at least one of delivery time information concerning delivery time required for delivering each of the allocable vehicles and calculated on the basis of the driving status information stored in the vehicle information storage and corresponding to the allocable vehicles and the customer delivery position information included in the vehicle allocation request information acquired by the vehicle allocation request information acquiring section, and the vehicle information stored in the vehicle information storage and corresponding to each of the allocable vehicles, to make at least one of the delivery time information and the vehicle information reportable to the customer, to suggest the customer to select a particular vehicle, recognizes the selection of the particular vehicle by recognizing an input manipulation made by the customer, via the setting input recognizer, and transmits, as information suggesting allocation, the vehicle allocation request information acquired by the vehicle allocation request information acquiring section, to the vehicle communication terminal mounted on the particular vehicle, based on the vehicle information corresponding to the particular vehicle.

4. The apparatus according to claim 1 or 3, wherein the driving status information is configured to include vehicle current position information concerning a current position of each of the vehicles, operating status information indicative of a vacant state and a charged driving state of each of the vehicles, and charged driving destination information concerning a destination in case of the charged driving state, and the allocable vehicle searching section determines the vacant state or the charged driving state from the operating status information included in the driving status information, calculates the delivery time based on the vehicle current position information included in the driving status information and the customer delivery position information included in the vehicle allocation request information if the vacant state is determined, or calculates the delivery time based on the vehicle current position information and the charged driving destination information and customer delivery position information included in the driving status information if the charged driving state is determined, and searches for, as the allocable vehicles, vehicles each having the calculated delivery time equal to or shorter than a predetermined threshold value.

5. The apparatus according to claim 1 or 3, wherein if the allocable vehicle searching section recognizes that there is no applicable vehicle as a result of searching for the allocable vehicles, the allocable vehicle searching section processes search result information indicative of no applicable vehicle, to be reportable to the customer.

6. The apparatus according to claim 1 or 3, further comprising:

a discount information calculation section which calculates discount information concerning a discount rate to a charge for use of each of the allocable vehicles, based on at least one of the vehicle information and the driving status information stored in the vehicle information storage, and also based on the vehicle allocation request information acquired by the vehicle allocation request information acquiring section; and a storage which stores the discount information calculated by the discount information calculation section, with the discount information kept transmittable to the vehicle communication terminals mounted on the allocable vehicles or to a payment processor which executes a payment processing for charges for the vehicles.

7. A vehicle allocation processing apparatus which executes a vehicle allocation processing of allocating vehicles to customers in accordance with requests from the customers, comprising:

a driving status information acquiring section which acquires driving status information concerning driving states of the vehicles, from vehicle communication terminals mounted on the vehicles and for transmitting/receiving information;

a vehicle information storage which stores the driving status information acquired by the driving status information acquiring section, with the driving status information linked to vehicle information concerning the vehicle;

a vehicle allocation request information acquiring section which acquires vehicle allocation request information concerning a vehicle requested by a customer and including customer delivery position information concerning a delivery position to which the customer requests delivery;

a vehicle allocation processor which transmits, as information suggesting allocation, the vehicle allocation request information acquired by the vehicle allocation request information acquiring section to the vehicle communication terminals mounted on allocable vehicles, based on the vehicle information stored in the vehicle information storage;

a discount information calculation section which calculates discount information concerning a discount rate to a charge for use of each of the allocable vehicles, based on at least one of the vehicle information and the driving status information stored in the vehicle information storage, and also based on the vehicle allocation request information acquired by the vehicle allocation request information acquiring section; and a storage which stores the discount information calculated by the discount information calculation section, with the discount information kept transmittable to the vehicle communication terminals mounted on the allocable vehicles or to a payment processor which executes a payment processing for charges for the vehicles.

8. The apparatus according to claim 7, further comprising:

an allocable vehicle searching section which searches for the allocable vehicles, based on the vehicle allocation request information acquired by the vehicle allocation request information acquiring section, and the vehicle information and driving status information stored in the vehicle information storage.

9. The apparatus according to claim 1, 3 or 7, wherein the discount information calculation section calculates delivery time required for delivering each of the allocable vehicles, based on the customer delivery position information included in the vehicle allocation request information acquired by the vehicle allocation request information acquiring section, and the driving status information stored in the vehicle information storage, and calculates the discount information concerning the discount rate to the charge for each of the allocable vehicles.

10. The apparatus according to claim 9, wherein the vehicle allocation request information is configured to include customer request delivery time information concerning delivery time requested by the customer, and the discount information calculation section compares the delivery time required for delivering each of the allocable vehicles, with the delivery time based on the customer request delivery time information included in the vehicle allocation request information, to calculate the discount information concerning the discount rate to the charge for each of the allocable vehicles.

11. The apparatus according to claim 9, wherein
the driving status information is configured to include vehicle current position information concerning a current position of each of the vehicles, operating status information indicative of a vacant state and a charged driving state of each of the vehicles, and charged driving destination information concerning a destination in case of the charged driving state, and
the discount information calculation section determines the vacant state or the charged driving state from the operating status information included in the driving status information when calculating the delivery time required for delivering each of the allocable vehicles, and calculates the delivery time on the basis of the vehicle current position information included in the driving status information and the customer delivery position information included in the vehicle allocation request information, if the vacant state is determined, or calculates the delivery time on the basis of the vehicle current position information, the charged driving destination information included in the driving status information, and the customer delivery position information, if the charged driving state is determined.

12. The apparatus according to claim 1, 3 or 7, wherein the discount information calculation section calculates a delivery distance to drive when delivering each of the allocable vehicles, based on the customer delivery position information included in the vehicle allocation request information acquired by the vehicle allocation request information acquiring section, and the driving status information stored in the vehicle information storage, and calculates the discount information concerning the discount rate to the charge for each of the allocable vehicles, based on the delivery distance.

13. The apparatus according to claim 12, wherein
the vehicle information is configured to include vehicle waiting position information concerning a waiting position of each of the allocable vehicles, and
the discount information calculation section calculates a vacant driving distance of each of the allocable vehicles, based on the vehicle waiting position information and the driving status information stored in the vehicle information storage, and compares the vacant driving distance of each of the allocable vehicles, with the delivery distance to drive when delivering each of the allocable vehicles, to calculate the discount information concerning the discount rate to the charge for each of the allocable vehicles.

14. The apparatus according to claim 1, 3 or 7, wherein
the vehicle information is configured to include vehicle service information concerning contents of services held by the vehicles,
the vehicle allocation request information is configured to include customer request service information concerning contents of services with respect to the vehicle requested by the customer, and
the discount information calculation section compares the customer request service information included in the vehicle allocation request information acquired by the vehicle allocation request information acquiring section, with the vehicle service information included in the vehicle information stored in the vehicle information storage, to calculate the discount information concerning the discount rate to the charge for each of the allocable vehicles.

15. The apparatus according to claim 1, 3 or 7, further comprising a setting input recognizer which recognizes an input manipulation made by the customer, wherein
the vehicle allocation processor processes listed information including the discount information stored in the storage, to make the listed information reportable to the customer, to suggest the customer to select a particular vehicle, recognizes the selection of the particular vehicle by recognizing an input manipulation made by the customer, via the setting input recognizer, and transmits, as information suggesting allocation, the vehicle allocation request information acquired by the vehicle allocation request information acquiring section to the vehicle communication terminal mounted on the particular vehicle, based on the vehicle information corresponding to the particular vehicle.

16. The apparatus according to any of claims 1, 3 and 7, wherein the vehicle allocation request information acquiring section acquires the vehicle allocation request information from a communication terminal operated by the customer and capable of transmitting/receiving information.

17. The apparatus according to claim 16, wherein
the communication terminal has customer identification information to identify the customer,
the vehicle allocation request information acquiring section acquires the vehicle allocation request information including the customer identification information from the communication terminal,
the vehicle allocation processor transmits, as the information suggesting allocation, the vehicle allocation request information acquired by the vehicle allocation request information acquiring section, to the vehicle communication terminal mounted on the particular vehicle, and
the apparatus further comprises:
a customer information storage which stores the customer specific information including the customer identification information and specifying the customer;
an authentication section which compares the customer identification information included in the vehicle allocation request information acquired by the vehicle allocation request information acquiring section, with the customer specific information stored in the customer information storage, to authenticate the customer identification information;
a use complete information acquiring section which acquires use complete information linked to charge information concerning the charge for the particular vehicle, and the customer identification information included in the vehicle allocation request information, from the vehicle communication terminal of the particular vehicle, after the customer identification information is authenticated by the authentication section and the vehicle allocation request information is transmitted to the vehicle communication terminal of the particular vehicle from the vehicle allocation processor; and
a payment processor which executes a payment processing, based on the customer specific information stored in the customer information storage and corresponding to the customer identification information in the use complete information acquired by the use complete information acquiring section, and the charge information in the use complete information.

18. The apparatus according to claim 1, 3 or 7, wherein the discount information is point information concerning points given to each customer who uses allocation of any vehicle, the vehicle allocation request information acquiring section acquires the vehicle allocation request information from the communication terminal which has customer identification information to identify the customer, is operated by the customer, and is for transmitting/receiving information, the vehicle allocation processor transmits, as the information suggesting allocation, the vehicle allocation request information acquired by the vehicle allocation request information acquiring section, to the vehicle communication terminals mounted on the allocable vehicles, the storage stores the discount information calculated by the discount information calculation section, and the customer identification information included in the vehicle allocation request information used when calculating the discount information, and the apparatus further comprises:

a customer information storage which stores customer specific information including the customer identification information and specifying the customer;

an authentication section which compares the customer identification information included in the vehicle allocation request information acquired by the vehicle allocation request information acquiring section, with the customer specific information stored in the customer information storage, to authenticate the customer identification information;

a use complete information acquiring section which acquires use complete information linked to charge information concerning the charge for the particular vehicle, and the customer identification information included in the vehicle allocation request information, from the vehicle communication terminal of the particular vehicle, after the customer identification information is authenticated by the authentication section and the vehicle allocation request information is transmitted to the vehicle communication terminal of the particular vehicle from the vehicle allocation processor; and a payment processor which executes a payment processing, based on the customer specific information stored in the customer information storage and corresponding to the customer identification information in the use complete information acquired by the use complete information acquiring section, and also based on the charge information in the use complete information, and makes the customer information storage store the discount information stored in the storage and corresponding to the customer identification information in the use complete information, together with the customer specific information, after executing the payment processing.

19. The apparatus according to any of claim 1, 3 and 7, wherein the vehicle allocation request information is configured to include customer delivery position information concerning a delivery position to which the customer requests delivery or customer destination information concerning a destination at which the customer aims, the apparatus further comprises a setting input recognizer which recognizes an input manipulation made by the customer, and a map information storage which stores map information, the setting input recognizer processes the map information stored in the map information storage, to make the map information displayable and to suggest the customer to make an input manipulation and recognizes the instruction of the predetermined position on the map information as the input manipulation made by the customer, and the vehicle allocation request information acquiring section acquires the instruction position recognized by the setting input recognizer, as the customer delivery position information or the customer destination information.

20. A vehicle allocation processing system which executes a vehicle allocation processing of allocating vehicles to customers in accordance with requests from the customers, comprising:

the vehicle allocation processing apparatus according to any of claims 1, 3 and 7;

a vehicle communication terminal mounted on each of the vehicles and for transmitting/receiving information; and a communication section enabling transmission/reception of information between the vehicle allocation processor and the vehicle communication terminal of each of the vehicles.

21. A vehicle allocation processing system which executes a vehicle allocation processing of allocating vehicles to customers in accordance with requests from the customers, comprising:

the vehicle allocation processing apparatus according to any of claims 1, 3 and 7;

a vehicle communication terminal mounted on each of the vehicles and for transmitting/receiving information;

a communication terminal which transmits vehicle allocation request information concerning a vehicle requested by a customer; and a communication section enabling transmission/reception of information among the vehicle allocation processing apparatus the vehicle communication terminal of each of the vehicles, and the communication terminal.

22. A vehicle allocation processing method for executing a vehicle allocation processing of allocating vehicles to customers in accordance with requests from the customers, comprising steps of:

acquiring driving status information concerning driving states of the vehicles, from vehicle communication terminals mounted on the vehicles and for transmitting/receiving information;

storing the acquired driving status information linked to vehicle information concerning the vehicles;

acquiring vehicle allocation request information concerning the vehicle requested by the customer and including customer delivery position information concerning a delivery position to which the customer requests delivery, and customer destination information concerning a destination at which the customer aims;

searching for allocable vehicles, based on the acquired vehicle allocation request information and the stored vehicle information and driving status information; and transmitting, as information suggesting allocation, the acquired vehicle allocation request information to the vehicle communication terminals mounted on the allocable vehicles, based on the stored vehicle information corresponding to the allocable vehicles.

23. A vehicle allocation processing method for executing a vehicle allocation processing of allocating vehicles to customers in accordance with requests from the customers, comprising steps of:
acquiring driving status information concerning driving states of the vehicles, from vehicle communication terminals mounted on the vehicles and for transmitting/receiving information;
storing the acquired driving status information linked to vehicle information concerning the vehicles;
recognizing an input manipulation made by the customer, to acquire vehicle allocation request information concerning the vehicle requested by the customer and including customer delivery position information concerning a delivery position to which the customer requests delivery;
searching for allocable vehicles, based on the acquired vehicle allocation request information, and the stored vehicle information and driving status information; and
processing at least one of delivery time information concerning delivery time required for delivering each of the allocable vehicles and calculated on the basis of the stored driving status information corresponding to each of the allocable vehicles and the customer delivery position information included in the acquired vehicle allocation request information, and the stored vehicle information corresponding to each of the allocable vehicles, to make at least one of the delivery time information and the vehicle information reportable to the customer, to suggest the customer to select a particular vehicle, then recognizing the selection of the particular vehicle by recognizing an input manipulation made by the customer, and transmitting, as information suggesting allocation, the acquired vehicle allocation request information, to the vehicle communication terminal mounted on the particular vehicle, based on the vehicle information corresponding to the particular vehicle.

24. A vehicle allocation processing method for executing a vehicle allocation processing of allocating vehicles to customers in accordance with requests from the customers, comprising steps of:
acquiring driving status information concerning driving states of the vehicles, from vehicle communication terminals mounted on the vehicles and for transmitting/receiving information;
storing the acquired driving status information linked to vehicle information concerning the vehicles;
acquiring vehicle allocation request information concerning the vehicle requested by the customer and including customer delivery position information concerning a delivery position to which the customer requests delivery;
transmitting, as information suggesting allocation, the acquired vehicle allocation request information to the vehicle communication terminals mounted on allocable vehicles, based on the stored vehicle information;
calculating discount information concerning a discount rate to a charge fQr use of each of the allocable vehicles, based on at least one of the stored vehicle information and the driving status information, and the acquired vehicle allocation request information; and
storing the calculated discount information linked to the vehicle allocation request information used for calculating the discount information and kept transmittable to the vehicle communication terminals mounted on the allocable vehicles or to a payment processor which executes a payment processing for settling charges for the vehicles.

25. A vehicle allocation processing program embodied in a recording medium in a computer-readable manner, wherein the program makes a computer execute a vehicle allocation processing method for executing a vehicle allocation processing of allocating vehicles to customers in accordance with requests from the customers, comprising steps of:
acquiring driving status information concerning driving states of the vehicles, from vehicle communication terminals mounted on the vehicles and for transmitting/receiving information;
storing the acquired driving status information linked to vehicle information concerning the vehicles;
acquiring vehicle allocation request information concerning the vehicle requested by the customer and including customer delivery position information concerning a delivery position to which the customer requests delivery, and customer destination information concerning a destination at which the customer aims;
searching for allocable vehicles, based on the acquired vehicle allocation request information and the stored vehicle information and driving status information; and
transmitting, as information suggesting allocation, the acquired vehicle allocation request information to the vehicle communication terminals mounted on the allocable vehicles, based on the stored vehicle information corresponding to the allocable vehicles.

26. A vehicle allocation processing program embodied in a recording medium in a computer-readable manner, wherein the program makes a computer execute a vehicle allocation processing method for executing a vehicle allocation processing of allocating vehicles to customers in accordance with requests from the customers, comprising steps of:
acquiring driving status information concerning driving states of the vehicles, from vehicle communication terminals mounted on the vehicles and for transmitting/receiving information;
storing the acquired driving status information linked to vehicle information concerning the vehicles;
recognizing an input manipulation made by the customer, to acquire vehicle allocation request information concerning the vehicle requested by the customer and including customer delivery position information concerning a delivery position to which the customer requests delivery;
searching for allocable vehicles, based on the acquired vehicle allocation request information, and the stored vehicle information and driving status information; and
processing at least one of delivery time information concerning delivery time required for delivering each of the allocable vehicles and calculated on the basis of the stored driving status information corresponding to each of the allocable vehicles and the customer delivery position information included in the acquired vehicle allocation request information, and the stored vehicle information corresponding to each of the allocable vehicles, to make at least one of the delivery time information and the vehicle information reportable to the customer, to suggest the customer to select a particular vehicle, then recognizing the selection of the particular vehicle by recognizing an input manipulation made by the customer, and transmitting, as information suggesting allocation, the acquired vehicle allocation request information, to the vehicle communication terminal mounted on the particular vehicle, based on the vehicle information corresponding to the particular vehicle.

27. A vehicle allocation processing program embodied in a recording medium in a computer-readable manner, wherein the program makes a computer execute a vehicle allocation processing method for executing a vehicle allocation processing of allocating vehicles to customers in accordance with requests from the customers, comprising steps of:

acquiring driving status information concerning driving states of the vehicles, from vehicle communication terminals mounted on the vehicles and for transmitting/receiving information;

storing the acquired driving status information linked to vehicle information concerning the vehicles;

acquiring vehicle allocation request information concerning the vehicle requested by the customer and including customer delivery position information concerning a delivery position to which the customer requests delivery;

transmitting, as information suggesting allocation, the acquired vehicle allocation request information to the vehicle communication terminals mounted on allocable vehicles, based on the stored vehicle information;

calculating discount information concerning a discount rate to a charge for use of each of the allocable vehicles, based on at least one of the stored vehicle information and the driving status information, and the acquired vehicle allocation request information; and storing the calculated discount information linked to the vehicle allocation request information used for calculating the discount information and kept transmittable to the vehicle communication terminals mounted on the allocable vehicles or to a payment processor which executes a payment processing for settling charges for the vehicles.

28. A recording medium which records the vehicle allocation processing program according to any of claims 25 to 27, to be readable from the computer.

* * * * *